US012659781B2

(12) United States Patent
Song et al.

(10) Patent No.: US 12,659,781 B2
(45) Date of Patent: Jun. 16, 2026

(54) MEASUREMENT REPORTING METHOD AND APPARATUS

(71) Applicant: DATANG MOBILE COMMUNICATIONS EQUIPMENT CO., LTD., Beijing (CN)

(72) Inventors: Lei Song, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 334 days.

(21) Appl. No.: 18/553,196

(22) PCT Filed: Mar. 17, 2022

(86) PCT No.: PCT/CN2022/081497
§ 371 (c)(1),
(2) Date: Sep. 28, 2023

(87) PCT Pub. No.: WO2022/206410
PCT Pub. Date: Oct. 6, 2022

(65) Prior Publication Data
US 2024/0196257 A1 Jun. 13, 2024

(30) Foreign Application Priority Data

Apr. 2, 2021 (CN) ......................... 202110363857.X
Aug. 6, 2021 (CN) ......................... 202110904384.X

(51) Int. Cl.
*H04W 24/10* (2009.01)
*H04L 5/00* (2006.01)

(52) U.S. Cl.
CPC ........... *H04W 24/10* (2013.01); *H04L 5/0051* (2013.01)

(58) Field of Classification Search
CPC ................................. H04W 24/10; H04L 5/00
See application file for complete search history.

(56) References Cited

U.S. PATENT DOCUMENTS

2018/0042028 A1    2/2018  Nam et al.
2018/0219664 A1*   8/2018  Guo ..................... H04B 17/318
                           (Continued)

FOREIGN PATENT DOCUMENTS

CN          110035450 A      7/2019
CN          110100492 A      8/2019
                     (Continued)

OTHER PUBLICATIONS

NTT DOCOMO, Inc, "Discussion on beam management for MTRP", 3GPP TSG RAN WG1 #103-e, e-Meeting, Oct. 26-Nov. 13, 2020, total 8 pages, R1-2009177.

(Continued)

*Primary Examiner* — Zhiren Qin
(74) *Attorney, Agent, or Firm* — KILPATRICK TOWNSEND & STOCKTON LLP

(57) ABSTRACT

Disclosed in embodiments of the present application are a measurement reporting method and apparatus. The method includes: determining, according to a configuration of a network device, a QCL-Type D parameter and a measurement set for each channel state information reference signal (CSI-RS) group used for measurement; and measuring the measurement set on the basis of the QCL-Type D parameter, and determining N groups of measurement report values, N being a positive integer not less than 1.

16 Claims, 3 Drawing Sheets

(56) References Cited

U.S. PATENT DOCUMENTS

| | | | | |
|---|---|---|---|---|
| 2019/0306924 A1 | 10/2019 | Zhang et al. | | |
| 2020/0154299 A1 | 5/2020 | Shi et al. | | |
| 2020/0336194 A1 | 10/2020 | Karjalainen et al. | | |
| 2020/0389875 A1 | 12/2020 | Guo et al. | | |
| 2022/0210807 A1* | 6/2022 | Park | H04L 1/1812 | |
| 2022/0240120 A1* | 7/2022 | Fan | H04B 17/318 | |
| 2022/0264343 A1* | 8/2022 | Guo | H04L 5/0048 | |
| 2022/0264348 A1* | 8/2022 | Manolakos | H04B 17/345 | |
| 2022/0394526 A1* | 12/2022 | Wang | H04W 72/0446 | |
| 2023/0021510 A1* | 1/2023 | Guo | H04L 5/0023 | |
| 2023/0040590 A1* | 2/2023 | Manolakos | G01S 5/0258 | |
| 2023/0180077 A1* | 6/2023 | Cui | H04L 5/0048 370/331 | |

FOREIGN PATENT DOCUMENTS

| | | |
|---|---|---|
| CN | 110391890 A | 10/2019 |
| CN | 110535515 A | 12/2019 |
| CN | 110635883 A | 12/2019 |
| CN | 110912665 A | 3/2020 |
| CN | 111771341 A | 10/2020 |
| WO | 2020029288 A1 | 2/2020 |
| WO | 2020198977 A1 | 10/2020 |
| WO | 2020258293 A1 | 12/2020 |
| WO | 2021052246 A1 | 3/2021 |

OTHER PUBLICATIONS

Moderator (Intel Corporation),"Summary#4 of AI: 8.1.2.4 Enhancements on HST-SFN deployment", 3GPP TSG RAN WG1 #104-e, e-Meeting, Jan. 25-Feb. 5, 2021, total 58 pages, R1-2102214.

Ericsson,"Enhancements to multi-beam operation", 3GPP TSG-RAN WG1 Meeting #97, Reno, USA, May 13-17, 2019, total 17 pages, R1-1907436.

OPPO,"Discussion on Multi-beam Operation Enhancements", 3GPP TSG RAN WG1 #98, Prague, CZ, Aug. 26-30, 2019, total 9 pages, R1-1908352.

OPPO,"Discussion on Multi-beam Operation Enhancements", 3GPP TSG RAN WG1 #99, Reno, USA, Nov. 18-22, 2019, total 13 pages, R1-1911844.

* cited by examiner

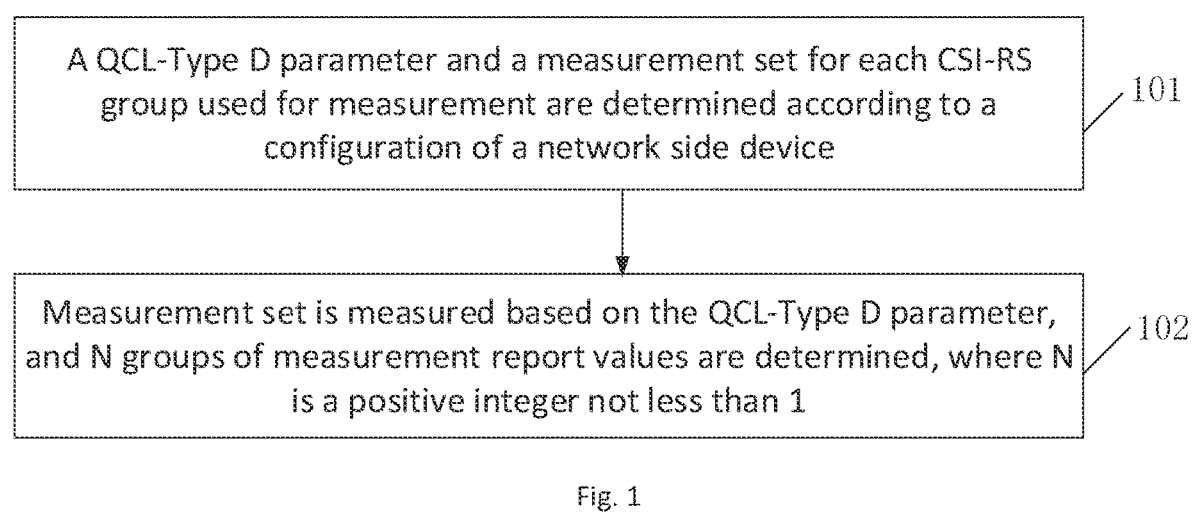

A QCL-Type D parameter and a measurement set for each CSI-RS group used for measurement are determined according to a configuration of a network side device — 101

Measurement set is measured based on the QCL-Type D parameter, and N groups of measurement report values are determined, where N is a positive integer not less than 1 — 102

Fig. 1

MEASUREMENT REPORTING METHOD AND APPARATUS

CROSS REFERENCE TO RELATED APPLICATIONS

The present application is a National Stage of International Application No. PCT/CN2022/081497, filed on Mar. 17, 2022, which claims priority to the Chinese patent application No. 202110363857.X, filed on Apr. 2, 2021 to the China Patent Office, and Chinese patent application No. 202110904384.X, filed on Aug. 6, 2021 to the China Patent Office, the entire contents of which are incorporated herein by reference.

FIELD

The present application relates to the field of communications, in particular to a measurement reporting method and apparatus.

BACKGROUND

At present, when a network side device is deployed with a plurality of transmission points (TRPs), and a terminal has a plurality of receiving antenna panels, the terminal may receive signals of the plurality of TRPs at the same time, that is, the terminal may receive signals with a plurality of different quasi-co-location type D (QCL-Type D) parameters at the same time.

However, in the prior art, in group based beam reporting and non-group based beam reporting, the terminal does not know which TRP a channel state information reference signal (CSI-RS) in a channel state information (CSI) measurement set comes from. Therefore, 2 or at most 4 beams reported may be sent by the same TRP or different TRPs. For example, in a TRP transmission scenario, the beams reported by the terminal according to a maximum value of a layer-1 reference signal receiving power (L1-RSRP) may come from the same TRP, namely a measurement result suitable for single TRP transmission, and it also cannot provide an effective measurement result for multi-TRP transmission.

It can be seen that in the prior art, it does not consider measurement reporting under a multi-TRP multi-panel scenario, and a beam measurement reporting method under the multi-TRP scenario is urgently required.

SUMMARY

The present application provides a measurement reporting method and apparatus for providing a beam measurement reporting method under a multi-TRP scenario, so that a terminal may report a required measurement result that is conducive to simultaneous transmission of the multi-TRP.

Embodiments of the present application is as follows.

In a first aspect, a measurement reporting method is provided, and includes:

determining, according to a configuration of a network side device, a QCL-Type D parameter and a measurement set for each CSI-RS group used for measurement, where the configuration of the network side device includes at least one CSI resource setting; and measuring the measurement set based on the QCL-Type D parameter, and determining N groups of measurement report values, where N is a positive integer not less than 1.

In a possible implementation, the determining, according to the configuration of the network side device, the QCL-Type D parameter for each CSI-RS group used for measurement, includes:

in a case that the network side device configures one CSI resource setting for a terminal, the one CSI resource setting includes K CSI-RS groups, each CSI-RS group includes Z CSI-RS resources, and the CSI-RS resource in each CSI-RS group is configured with one or more QCL-Type D parameters; where Z is a positive integer not less than 1:

determining a first QCL-Type D parameter configured for each CSI-RS resource as the QCL-Type D parameter for the CSI-RS resource or for the CSI-RS group which includes the CSI-RS resource used for channel measurement; and determining the QCL-Type D parameter except for the first QCL-Type D parameter as the QCL-Type D parameters for the CSI-RS resource used for interference measurement.

In a possible implementation, the determining, according to the configuration of the network side device, the measurement set for each CSI-RS group used for measurement, includes:

in a case that the network side device configures one CSI resource setting, and the CSI resource setting includes K CSI-RS groups:

determining, in a case that an L1-SINR of an $m^{th}$ CSI-RS group is measured, that the $m^{th}$ CSI-RS group is for channel measurement, and other CSI-RS groups except for the $m^{th}$ CSI-RS group are for interference measurement; or, determining, in a case that a layer-1 reference signal receiving power (L1-RSRP) of the $m^{th}$ CSI-RS group is measured, that the $m^{th}$ CSI-RS group is for channel measurement; or, determining, in a case that an L1-SINR of the $m^{th}$ CSI-RS group is measured, that the $m^{th}$ CSI-RS group is for channel measurement and interference measurement;

where, m is any value from 0 to K; K is a positive integer not less than 1; and the CSI-RS groups for channel measurement and interference measurement belong to the measurement set, or the CSI-RS group for channel measurement belongs to the measurement set.

In a possible implementation, the determining, according to the configuration of the network side device, the QCL-Type D parameter for each CSI-RS group used for measurement, includes:

in a case that the network side device configures one CSI resource setting, the CSI resource setting includes K CSI-RS groups, each CSI-RS group includes Z CSI-RS resources, and the CSI-RS resource in each CSI-RS group is configured with one QCL-Type D parameter:

determining a QCL-Type D parameter configured for each CSI-RS resource as a QCL-Type D parameter for the CSI-RS resource or for the CSI-RS group which includes the CSI-RS resource used for channel measurement; and determining the QCL-Type D parameters configured for CSI-RS resources corresponding to other CSI-RS groups except for the group which includes the CSI-RS resource among the K CSI-RS groups as QCL-Type D parameters for the CSI-RS resource used for interference measurement;

or, determining, in a case that an $m^{th}$ CSI-RS group is measured, a QCL-Type D parameter of a $p^{th}$ CSI-RS resource of the $m^{th}$ CSI-RS group as a union set of the QCL-Type D parameter configured for the $p^{th}$ CSI-RS resource and QCL-Type D parameters configured for CSI-RS resources corresponding to CSI-RS groups except for the $m^{th}$ CSI-RS group, where p is any value from 0 to Z, and Z is a positive integer not less than 1; or, determining the QCL-Type D parameter configured for the CSI-RS resource as a QCL-Type D parameter of each CSI-RS resource;

where, m is any value from 0 to K; and K is a positive integer not less than 1.

In a possible implementation, the determining, according to the configuration of the network side device, the measurement set for each CSI-RS group used for measurement, includes:

in a case that the network side device configures two CSI resource settings, and each CSI resource setting includes K CSI-RS groups:

determining that K CSI-RS groups corresponding to a first CSI resource setting in the two CSI resource settings are for channel measurement, and determining any of the K CSI-RS groups corresponding to a second CSI resource setting in the two CSI resource settings as a CSI-RS group for interference measurement, corresponding to the any CSI-RS group, in the first CSI resource setting; or determining that an $m^{th}$ CSI-RS group of a first CSI resource setting in the two CSI resource settings is for channel measurement, and determining an $m^{th}$ CSI-RS group corresponding to a second CSI resource setting in the two CSI resource settings as a CSI-RS group for interference measurement for the $m^{th}$ CSI-RS group in the first CSI resource setting; or determining that a first CSI-RS group of each CSI resource setting is for channel measurement, and CSI-RS groups except for the first CSI-RS group are for interference measurement;

where, m is any value from 0 to K; K is a positive integer not less than 1; and the CSI-RS groups for channel measurement and interference measurement belong to the measurement set.

In a possible implementation, the determining, according to the configuration of the network side device, the QCL-Type D parameter for each CSI-RS group used for measurement, includes:

in a case that the network side device configures two CSI resource settings, and each CSI resource setting includes K CSI-RS groups:

determining, in a case that CSI-RS resources in an $m^{th}$ CSI-RS group of a second CSI resource setting are measured, QCL-Type D parameters of corresponding CSI-RS resources in an $m^{th}$ CSI-RS group of a first CSI resource setting as QCL-Type D parameters of the CSI-RS resources in the $m^{th}$ CSI-RS group of the second CSI resource setting; or, determining, in a case that CSI-RS resources in an $m^{th}$ CSI-RS group of each CSI resource setting are measured, the QCL-Type D parameters of the corresponding CSI-RS resources in the first CSI-RS group of each CSI resource setting as the QCL-Type D parameters of the CSI-RS resources in the $m^{th}$ CSI-RS group;

where, m is any value from 0 to K; and K is a positive integer not less than 1.

In a possible implementation, in a case that the CSI-RS group is a CSI-RS group explicitly configured by the network side device, the corresponding CSI-RS resources are two CSI-RS resources having the same sequential value or relative identity values or the same identity value in a configuration of the two CSI resource settings; or in a case that the CSI-RS group is a CSI-RS resource implicit group, the corresponding CSI-RS resources are two CSI-RS resources having the same sequential value after CSI-RS resources in two CSI-RS resource implicit groups are sorted according to identity values from low to high, where the CSI-RS resource implicit group is CSI-RS resources determined by implicit grouping based on a higher layer parameter or a group index or a physical cell identity document (ID) contained in each CSI-RS resource.

In a possible implementation, the $m^{th}$ CSI-RS group includes:

an $m^{th}$ CSI-RS group determined based on a configuration order or identities of CSI resource sets in the CSI resource settings from small to large; or an $m^{th}$ CSI-RS group determined based on identity values of the CSI-RS resources from small to large; or an $m^{th}$ CSI-RS group determined based on an order of higher layer parameter configuration values associated with the CSI-RS resources from small to large; or an $m^{th}$ CSI-RS group determined based on an order of identities of CSI-RS resources with smallest identities in respective CSI-RS groups from small to large.

In a possible implementation, the measuring the measurement set based on the QCL-Type D parameter, and determining the N groups of measurement report values, includes:

receiving CSI-RS resources according to the determined QCL-Type D parameters, and determining L1-RSRP or L1-SINR measurement values; and determining, according to the L1-RSRP or L1-SINR measurement values, CRI or SSBRI contained in the N groups of measurement report values.

In a possible implementation, the determining, according to the L1-RSRP or L1-SINR, the CRI or SSBRI contained in the N groups of measurement report values, includes:

sorting the L1-RSRP or L1-SINR measurement values of K CSI-RS groups corresponding to the CSI-RS resources from high to low, and determining the CRI or SSBRI contained in any group in the N groups of measurement report values; or sorting the L1-RSRP or L1-SINR measurement values of a single CSI-RS group corresponding to the CSI-RS resources; and determining, based on a maximum L1-RSRP or L1-SINR measurement value in each CSI-RS group, the CRI or SSBRI contained in any group in the N groups of measurement report values.

In a possible implementation, the determining the N groups of measurement report values, includes:

in a case that a terminal determines to report measurement values in the CSI-RS groups, the N groups of measurement report values include the CRI or SSBRI contained in each group of measurement report values determined based on sorting of the L1-RSRP or L1-SINR report values included in K CSI-RS groups corresponding to the CSI-RS resources from high to low; or in a case that the terminal determines to report the measurement values among the CSI-RS groups, the N groups of measurement report values include the CRI or SSBRI contained in each group of measurement report values determined based on sorting of the L1-RSRP or L1-SINR report values included in a single CSI-RS group corresponding to the CSI-RS resources and based on a maximum L1-RSRP or L1-SINR value in each CSI-RS group.

In a possible implementation, the determining the N groups of measurement report values, includes:

determining a CSI-RS resource of a $s^{th}$ L1-RSRP in a set of CSI-RS resource pairs that meet a condition as a first measurement report value in a $s^{th}$ group of measurement report values; and determining a CSI-RS resource of a $s^{th}$ L1-RSRP in the set of the CSI-RS resource pairs that are received simultaneously with a first CSI-RS resource as a second measurement report value in the $s^{th}$ group of measurement report values; and determining, in the set of the CSI-RS resource pairs that meet the condition, a first measurement report value and a second measurement report value in each $s^{th}$ group as the N groups of measurement report values, where s is a sequence number determined based on L1-RSRP values.

In a possible implementation, the determining the N groups of measurement report values, includes:

determining, in a set of CSI-RS resource pairs that meet a condition, sequential values determined by values corresponding to sums of L1-RSRPs of two CSI-RSs in respective CSI-RS resource pairs from high to low; and determining, according to the sequential values, each of groups of measurement report values in one-to-one correspondence with the sequential values, and determining the N groups of measurement report values based on measurement report values corresponding to all CSI-RS resource pairs, where T is a positive integer less than N.

In a possible implementation, the set of the CSI-RS resource pairs that meet the condition is determined by:

determining the set of the CSI-RS resource pairs that are received simultaneously, based on that resources in different CSI-RS resource groups that are received simultaneously, or resources in a same CSI-RS resource group that are received simultaneously; or, determining the set of the CSI-RS resource pairs that are received simultaneously by determining an association relationship between each QCL-Type D parameter and a terminal reception spatial filter, and when two CSI-RS resources are received, using different antenna panels or antenna groups to simultaneously receive the two CSI-RS resources and obtaining an expected measurement result determined based on the QCL-Type D parameters of the two CSI-RS resources and the association relationship, to determine that the two CSI-RS resources are received simultaneously; or, determining the set of the CSI-RS resource pairs that are received simultaneously based on that: in a case that the network side device configures the terminal to perform inter-group reporting or the terminal does not receive the configuration of the network side device, determining that the inter-group reporting is performed, and the terminal respectively selects specific CSI-RS resources that are received simultaneously among the K CSI-RS resource groups; or in a case that the network side device configures the terminal to perform intra-group reporting, the terminal selects specific CSI-RS resources that are received simultaneously in each CSI-RS resource group.

In a possible implementation, the method further includes:

determining a report format of the N groups of measurement report values, and report the N groups of measurement report values to the network side device with the report format.

In a possible implementation, the report format of the N groups of measurement report values is an intra-group difference format or an inter-group difference format.

In a possible implementation, the method further includes:

determining that the second to the $w^{th}$ measurement report values in each group of the N groups of measurement report values are all differences from a first measurement report value in the group, where w is a positive integer not less than 2; or, determining that a first group of measurement report values among the N groups of measurement report values are L1-RSRP values or L1-SINR values obtained by measuring, and determining a difference between a $r^{th}$ measurement report value in a $q^{th}$ group of measurement report values except for the first group of measurement report values and a $r^{th}$ measurement report value in the first group of measurement report values, where r is any value from 0 to w; or, determining that a first measurement report value in a first group among the N groups of measurement report values is an L1-RSRP value or L1-SINR value obtained by measuring, and the report values except for the first measurement report value in the first group and the measurement report values except for the first group are differences from the first measurement report value of the first group of measurement report values, where r is any value from 0 to w; or, determining that a first measurement report value in a first group among the N groups of measurement report values is an L1-RSRP value or L1-SINR value obtained by measuring, and other measurement report values except for the first measurement report value in the first group are differences from the first measurement report value in the first group of measurement report values, where r is any value from 0 to w.

In a possible implementation, the reporting the N groups of measurement report values to the network side device with the report format, includes:

reporting the N groups of measurement report values to the network side device with the report format through a physical uplink control channel (PUCCH) or a physical uplink shared channel (PUSCH).

In a possible implementation, after determining that the report format is difference report, the method further includes:

determining, in a case of reporting the N groups of measurement report values, predefined T bits added in uplink control information (UCI) indicate a position where a difference measurement value or a non-difference measurement value appears in a group, where T is determined based on the number of groups of measurement report values and the number of the measurement report values in each group.

In a possible implementation, after determining that the report format is difference report, the method further includes:

determining, in a case of reporting the N groups of measurement report values, a predefined number of bits in UCI indicates an association relationship between the measurement value and CSI-RS resource groups, or indicates whether corresponding CSI-RS resource groups exchange in order.

In a possible implementation, the reporting the N groups of measurement report values to the network side device with the report format, includes:

determining the number of reported bits of each difference
measurement value or each measurement value in the N
groups of measurement report values; and
reporting the N groups of measurement report values to
the network side device based on the number of
reported bits and a predefined report rule.
In a second aspect, a measurement reporting apparatus is
provided, and includes a memory, a transceiver and a
processor;
where the memory is configured to store a computer
program; the transceiver is configured to receive and
send data under control of the processor; and the
processor is configured to read the computer program
in the memory and execute:
determining, according to a configuration of a network
side device, a QCL-Type D parameter and a measure-
ment set for each CSI-RS group used for measurement,
where the configuration of the network side device
includes at least one CSI resource setting; and measur-
ing the measurement set based on the QCL-Type D
parameter; and determining N groups of measurement
report values, where N is a positive integer not less than
1.
In a possible implementation, the processor is configured
to execute:
in a case that the network side device configures one CSI
resource setting for a terminal, the one CSI resource
setting includes K CSI-RS groups, each CSI-RS group
includes Z CSI-RS resources, and the CSI-RS resource
in each CSI-RS group is configured with one or more
QCL-Type D parameters; where Z is a positive integer
not less than 1:
determining a first QCL-Type D parameter configured for
each of the CSI-RS resources as a QCL-Type D param-
eter for the CSI-RS resource or for the CSI-RS group
which includes the CSI-RS resource used for channel
measurement; and determining a QCL-Type D param-
eter except for the first QCL-Type D parameter as a
QCL-Type D parameter for the CSI-RS resource used
for interference measurement.
In a possible implementation, the processor is configured
to execute:
in a case that the network side device configures one CSI
resource setting, and the CSI resource setting includes
K CSI-RS groups:
determining, in a case that an L1-SINR of an $m^{th}$ CSI-RS
group is measured, that the $m^{th}$ CSI-RS group is for
channel measurement, and other CSI-RS groups except
for the $m^{th}$ CSI-RS group are for interference measure-
ment; or,
determining, in a case that an L1-RSRP of an $m^{th}$ CSI-RS
group is measured, that the $m^{th}$ CSI-RS group is for
channel measurement; or,
determining, in a case that an L1-SINR of an $m^{th}$ CSI-RS
group is measured, that the $m^{th}$ CSI-RS group is for
channel measurement and interference measurement;
where, m is any value from 0 to K; K is a positive integer
not less than 1; and the CSI-RS groups for channel
measurement and interference measurement belong to
the measurement set, or the CSI-RS group for channel
measurement belongs to the measurement set.
In a possible implementation, the processor is configured
to execute:
in a case that the network side device configures one CSI
resource setting, the CSI resource setting includes K
CSI-RS groups, each CSI-RS group includes Z CSI-RS resources, and the CSI-RS resource in each CSI-RS
group is configured with one QCL-Type D parameter:
determining a QCL-Type D parameter configured for each
of the CSI-RS resources as a QCL-Type D parameter
for the CSI-RS resource or for the CSI-RS group which
includes the CSI-RS resource used for channel mea-
surement; and determining QCL-Type D parameters
configured for CSI-RS resources corresponding to
other CSI-RS groups except for the group which
includes the CSI-RS resource among the K CSI-RS
groups as QCL-Type D parameters for the CSI-RS
resource used for interference measurement;
or,
determining, in a case that an $m^{th}$ CSI-RS group is
measured, a QCL-Type D parameter of a $p^{th}$ CSI-RS
resource of the $m^{th}$ CSI-RS group as a union set of the
QCL-Type D parameter configured for the $p^{th}$ CSI-RS
resource and QCL-Type D parameters configured for
CSI-RS resources corresponding to CSI-RS groups
except for the $m^{th}$ CSI-RS group, where p is any value
from 0 to Z, and Z is a positive integer not less than 1;
or,
determining the QCL-Type D parameter configured for
the CSI-RS resource as a QCL-Type D parameter of
each of the CSI-RS resources;
where, m is any value from 0 to K; and K is a positive
integer not less than 1.
In a possible implementation, the processor is configured
to execute:
in a case that the network side device configures two CSI
resource settings, and each CSI resource setting
includes K CSI-RS groups:
determining that K CSI-RS groups corresponding to a first
CSI resource setting in the two CSI resource settings
are for channel measurement, and determining any of K
CSI-RS groups corresponding to a second CSI resource
setting in the two CSI resource settings as a CSI-RS
group for interference measurement, corresponding to
the any CSI-RS group, in the first CSI resource setting;
or
determining that an $m^{th}$ CSI-RS group of a first CSI
resource setting in the two CSI resource settings is for
channel measurement, and determining an $m^{th}$ CSI-RS
group corresponding to a second CSI resource setting
in the two CSI resource settings as a CSI-RS group for
interference measurement for the $m^{th}$ CSI-RS group in
the first CSI resource setting; or
determining that a first CSI-RS group of each CSI
resource setting is for channel measurement, and CSI-
RS groups except for the first CSI-RS group are for
interference measurement;
where, m is any value from 0 to K; K is a positive integer
not less than 1; and the CSI-RS groups for channel
measurement and interference measurement belong to
the measurement set.
In a possible implementation, the processor is configured
to execute:
in a case that the network side device configures two CSI
resource settings, and each of the CSI resource settings
includes K CSI-RS groups:
determining, in a case that CSI-RS resources in an $m^{th}$
CSI-RS group of a second CSI resource setting are
measured, QCL-Type D parameters of corresponding
CSI-RS resources in an $m^{th}$ CSI-RS group of a first CSI
resource setting as QCL-Type D parameters of the
CSI-RS resources in the $m^{th}$ CSI-RS group of the
second CSI resource setting; or,

determining, in a case that CSI-RS resources in an $m^{th}$ CSI-RS group of each of the CSI resource settings are measured, QCL-Type D parameters of corresponding CSI-RS resources in a first CSI-RS group of each of the CSI resource settings as QCL-Type D parameters of the CSI-RS resources in the $m^{th}$ CSI-RS group;

where, m is any value from 0 to K; and K is a positive integer not less than 1.

In a possible implementation, in a case that the CSI-RS group is a CSI-RS group explicitly configured by the network side device, the corresponding CSI-RS resources are two CSI-RS resources having a same sequential value or relative identity values or a same identity value in a configuration of the two CSI resource settings; or in a case that the CSI-RS group is a CSI-RS resource implicit group, the corresponding CSI-RS resources are two CSI-RS resources having a same sequential value after CSI-RS resources in two CSI-RS resource implicit groups are sorted according to identity values from low to high, where the CSI-RS resource implicit group is CSI-RS resources determined by implicit grouping based on a higher layer parameter or a group index or a physical cell ID included in each CSI-RS resource.

In a possible implementation, the $m^{th}$ CSI-RS group includes:

an $m^{th}$ CSI-RS group determined based on a configuration order or identities of CSI resource sets in the CSI resource setting from small to large; or an $m^{th}$ CSI-RS group determined based on an order of identity values of the CSI-RS resources from small to large; or an $m^{th}$ CSI-RS group determined based on an order of higher layer parameter configuration values associated with the CSI-RS resources from small to large; or an $m^{th}$ CSI-RS group determined based on an order of identities of CSI-RS resources with smallest identities in respective CSI-RS groups from small to large.

In a possible implementation, the processor is configured to execute:

receiving CSI-RS resources according to the determined QCL-Type D parameters, and determining L1-RSRP or L1-SINR measurement values; and determining, according to the L1-RSRP or L1-SINR measurement values, CRI or SSBRI contained in the N groups of measurement report values.

In a possible implementation, the processor is configured to execute:

sorting the L1-RSRP or L1-SINR measurement values of K CSI-RS groups corresponding to the CSI-RS resources from high to low, and determining the CRI or SSBRI included in any group in the N groups of measurement report values; or sorting the L1-RSRP or L1-SINR measurement values of a single CSI-RS group corresponding to the CSI-RS resources; and determining, based on a maximum L1-RSRP or L1-SINR measurement value in each CSI-RS group, the CRI or SSBRI included in any group in the N groups of measurement report values.

In a possible implementation, the processor is configured to execute:

in a case that a terminal determines to report measurement values in the CSI-RS groups, the N groups of measurement report values include the CRI or SSBRI included in each group of measurement report values determined based on sorting of the L1-RSRP or L1-SINR report values included in K CSI-RS groups corresponding to the CSI-RS resources from high to low; or in a case that the terminal determines to report the measurement values among the CSI-RS groups, the N groups of measurement report values include the CRI or SSBRI included in each group of measurement report values determined based on sorting of the L1-RSRP or L1-SINR report values included in a single CSI-RS group corresponding to the CSI-RS resources and based on a maximum L1-RSRP or L1-SINR value in each CSI-RS group.

In a possible implementation, the processor is configured to execute:

determining a CSI-RS resource of a $s^{th}$ L1-RSRP in a set of CSI-RS resource pairs that meet a condition as a first measurement report value in a $s^{th}$ group of measurement report values; and determining a CSI-RS resource of the $s^{th}$ L1-RSRP in the set of the CSI-RS resource pairs that are received simultaneously with a first CSI-RS resource as a second measurement report value in the $s^{th}$ group of measurement report values; and determining, in the set of the CSI-RS resource pairs that meet the condition, a first measurement report value and a second measurement report value in each $s^{th}$ group as the N groups of measurement report values, where s is a sequence number determined based on L1-RSRP values.

In a possible implementation, the processor is configured to execute:

determining, in a set of CSI-RS resource pairs that meet a condition, sequential values determined by values corresponding to sums of L1-RSRPs of two CSI-RSs in respective CSI-RS resource pairs from high to low; and determining, according to the sequential values, each of groups of measurement report values in one-to-one correspondence with the sequential values; and determining the N groups of measurement report values based on measurement report values corresponding to all CSI-RS resource pairs, where T is a positive integer less than N.

In a possible implementation, the set of the CSI-RS resource pairs that meet the condition is determined by:

determining the set of the CSI-RS resource pairs that are received simultaneously, based on that resources in different CSI-RS resource groups that are received simultaneously, or resources in a same CSI-RS resource group that are received simultaneously;

or, determining the set of the CSI-RS resource pairs that are received simultaneously by determining an association relationship between each QCL-Type D parameter and a terminal reception spatial filter, and when two CSI-RS resources are received, using different antenna panels or antenna groups to simultaneously receive the two CSI-RS resources and obtaining an expected measurement result determined based on the QCL-Type D parameters of the two CSI-RS resources and the association relationship, to determine that the two CSI-RS resources are received simultaneously;

or, determining the set of the CSI-RS resource pairs that are received simultaneously based on that: in a case that the network side device configures the terminal to perform inter-group reporting or the terminal does not receive the configuration of the network side device, determining that the inter-group reporting is performed, and the terminal respectively selects specific CSI-RS resources that are received simultaneously among the K CSI-RS resource groups; or in a case that the network side device configures the terminal to perform intra-group reporting, the terminal selects specific CSI-RS resources that are received simultaneously in each CSI-RS resource group.

In a possible implementation, the processor is further configured to execute:

determining a report format of the N groups of measurement report values, and reporting the N groups of measurement report values to the network side device with the report format.

In a possible implementation, the report format of the N groups of measurement report values is an intra-group difference format or an inter-group difference format.

In a possible implementation, the processor is configured to execute:

determining that the second to the $w^{th}$ measurement report values in each group of the N groups of measurement report values are all differences from a first measurement report value in the group, where w is a positive integer not less than 2;

or, determining that a first group of measurement report values among the N groups of measurement report values are L1-RSRP values or L1-SINR values obtained by measuring, and determining a difference between a $r^{th}$ measurement report value in a $q^{th}$ group of measurement report values except for the first group of measurement report values and a $r^{th}$ measurement report value in the first group of measurement report values, where r is any value from 0 to w;

or, determining that a first measurement report value in a first group among the N groups of measurement report values is an L1-RSRP value or L1-SINR value obtained by measuring, and measurement report values except for the first measurement report value in the first group and measurement report values except for the first group are differences from the first measurement report value of the first group of measurement report values, where r is any value from 0 to w;

or, determining that a first measurement report value in a first group among the N groups of measurement report values is an L1-RSRP value or L1-SINR value obtained by measuring, and other measurement report values except for the first measurement report value in the first group are differences from the first measurement report value in the first group of measurement report values, where r is any value from 0 to w.

In a possible implementation, the processor is configured to execute:

reporting the N groups of measurement report values to the network side device with the report format through a PUCCH or a PUSCH.

In a possible implementation, the processor is configured to execute:

determining, in a case of reporting the N groups of measurement report values, predefined T bits added in UCI indicate a position where a difference measurement value or a non-difference measurement value appears in a group, where T is determined based on the number of groups of measurement report values and the number of the measurement report values in each group.

In a possible implementation, the processor is configured to execute:

determining, in a case of reporting the N groups of measurement report values, a predefined number of bits in UCI indicates an association relationship between the measurement value and CSI-RS resource groups, or indicates whether corresponding CSI-RS resource groups exchange in order.

In a possible implementation, the processor is configured to execute:

determining the number of reported bits of each difference measurement value or each measurement value in the N groups of measurement report values; and reporting the N groups of measurement report values to the network side device based on the number of reported bits and a predefined report rule.

In a third aspect, a measurement reporting apparatus is provided, and includes:

a first determining device, configured to determine, according to a configuration of a network side device, a QCL-Type D parameter and a measurement set for each CSI-RS group used for measurement; and a second determining device, configured to measure the measurement set based on the QCL-Type D parameter, and determine N groups of measurement report values, where N is a positive integer not less than 1.

In a fourth aspect, embodiments of the present application provide a processor readable storage medium, storing a computing program, where the computer program is configured to cause a processor to execute any one method as described in the first aspect.

In the embodiments of the present application, the QCL-Type D parameters and the measurement set for each CSI-RS group used for measurement may be determined according to the configuration of the network side device. For example, the network side device may configure one CSI resource setting, one CSI resource setting includes K CSI-RS groups, each CSI-RS group includes Z CSI-RS resources, and the CSI-RS resource in each CSI-RS group is configured with one or more QCL-Type D parameters, so that the QCL-Type D parameters for the CSI-RS group used for measurement and the measurement set to which the CSI-RS group belongs for the CSI-RS group used for channel measurement and/or interference measurement may be determined based on a configuration of a network side. Further, the measurement set may be measured based on the QCL-Type D parameters, and N groups of measurement report values are determined, where N is a positive integer not less than 1. It can be seen that according to the method provided in the embodiments of the present application, the terminal may report N groups of measurement results when multiple TRPs are transmitted for the terminal, which facilitates the network side device to provide a suitable multi-TRP related transmission solution for the terminal according to the measurement report values.

BRIEF DESCRIPTION OF FIGURES

Accompanying drawings herein are incorporated into the description, constitute a part of the description, illustrate the embodiments consistent with the present application, serve to explain the principles of the present application together with the description, and do not constitute an improper limitation on the present application.

FIG. 1 is a schematic flow chart of a measurement reporting method provided by embodiments of the present application.

DETAILED DESCRIPTION

Figure 2:
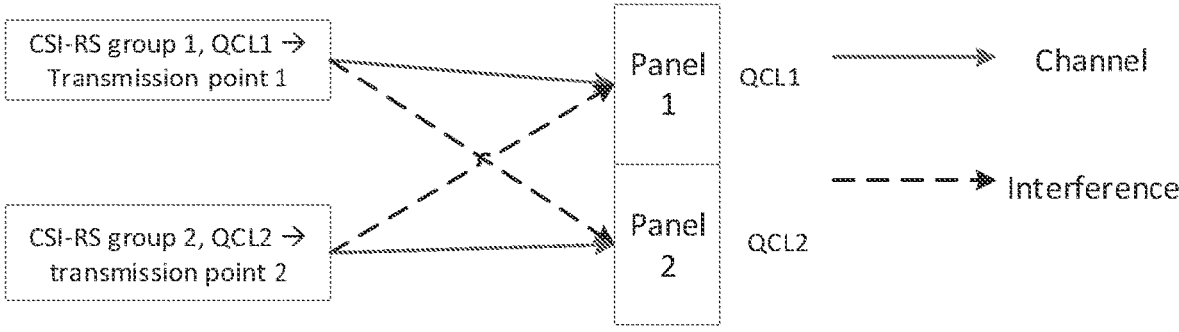
FIG. 2 is a schematic diagram of measurement reporting provided by embodiments of the present application.

In order to make the embodiments of the present application clearer, the embodiments of the present application will be clearly and completely described in the following with reference to drawings in the embodiments of the present application. Apparently, the described embodiments are only some rather than all of the embodiments of the present application. Without conflict, the embodiments and features in the embodiments in the present application may be arbitrarily combined with each other. Moreover, although a logical order is shown in the flow chart, in some cases, the shown or described steps may be executed in an order different from this order here.

In order to better understand the solution, some involved processes and terms are explained below.

1. A Terminal Device.

The terminal device involved in the embodiments of the present application may refer to a device that provides voice and/or data connectivity to a user, a handheld device with a wireless connection function, or other processing devices connected to a wireless modem. In different systems, a name of the terminal device may be different. For example, in a $5^{th}$ generation mobile communication technology (5G) system, the terminal device may be called user equipment (UE). The wireless terminal device may communicate with one or more core networks (CNs) via a radio access network (RAN). The wireless terminal device may be a mobile terminal device, such as a mobile phone (or called "cellular" phone) and a computer with a mobile terminal device, for example, may be a portable, pocket-size, handheld, computer built-in or vehicle-mounted mobile device, which exchanges language and/or data with the RAN. For example, it may be a device such as a personal communication service (PCS) telephone, a cordless telephone, a session initiated protocol (SIP) telephone, a wireless local loop (WLL) station, a personal digital assistant (PDA) or the like. The wireless terminal device may also be called a system, a subscriber device, a subscriber station, a mobile station, a mobile, a remote station, an access point, a remote terminal, an access terminal, a user terminal, a user agent and a user device, which is not limited in the embodiments of the present application.

2. A Network Side Device.

The network side device involved in the embodiments of the present application may be a base station, and the base station may include a plurality of cells that provide services for the terminal. According to different specific application occasions, the base station may also be called an access point, or may refer to a device in an access network that communicates with a wireless terminal device through one or more sectors on an air interface, or may be called other names. The network side device may be configured to mutually convert received air frames and internet protocol (IP) packets, and act as a router between the wireless terminal device and the rest of the access network, where the rest of the access network may include an IP communication network. The network side device may further coordinate attribute management of the air interface. For example, the network side device in the embodiments of the present application may be a base transceiver station (BTS) in a global system for mobile communications (GSM) or code division multiple access (CDMA), may also be a NodeB in wide-band code division multiple access (WCDMA), may further be an evolutional network device (Node B, eNB or e-NodeB) in a long term evolution (LTE) system, a 5G base station (gNB) in a 5G network architecture (next generation system), and may also be a home evolved Node B (HeNB), a relay node, a femto, a picocell (pico) and the like, which is not limited in the embodiments of the present application. In some network structures, the network side device may include centralized unit (CU) nodes and distributed unit (DU) nodes, and centralized units and distributed units may also be geographically separated.

Specifically, the network side device and the terminal device may each use one or more antennas for multi input multi output (MIMO) transmission, and the MIMO transmission may be single user MIMO (SU-MIMO) or multiple user MIMO (MU-MIMO). According to the shape and number of root antenna combinations, the MIMO transmission may be 2D-MIMO, 3D-MIMO, FD-MIMO or massive-MIMO, and may also be diversity transmission, precoding transmission, beamforming transmission or the like.

3. The CSI Reporting Process.

In existing protocols, the network side device may configure a CSI resource setting for the terminal, and its corresponding higher layer parameter may be represented as CSI-ResourceConfig; and configure a CSI reporting setting, and its corresponding higher layer parameter may be represented as CSI-ReportConfig for measurement and reporting of the CSI. Each CSI reporting setting is associated with at most three CSI resource settings, and one report quantity is configured to indicate the content reported by the terminal. Specifically, the report quantity contains some or all of the following: a layer-1 reference signal receiving power (L1-RSRP), and its corresponding higher layer parameter 'cri-RSRP' or 'ssb-Index-RSRP'; a layer-1 signal to interference plus noise ratio (L1-SINR), and its corresponding higher layer parameter 'cri-SINR' or 'ssb-Index-SINR'; and a channel quality indication (CQI), a precoding matrix indicator (PMI), a rank indication (RI), a CSI-RS resource indication (CRI), a synchronization signal block resource indicator (SSBRI) and the like.

The terminal device may measure the CSI resource setting associated with the CSI reporting setting, and report according to the report quantity configured in the CSI reporting setting.

4. Beam Reporting.

The L1-RSRP and L1-SINR are both reporting parameters for beam quality in a beam management process, and its reporting process adopts the CSI reporting process described above.

Further, the network side device may further configure the terminal to perform group based beam reporting and non-group based beam reporting. That is, the CSI reporting setting configuration (CSI-ReportConfig) contains a parameter groupBasedBeamReporting, specifically, the number of the reported beams may be configured, namely a parameter nrofReportedRS, and there are at most four reported beams.

However, as mentioned earlier, in the related art, measurement reporting is not considered for a multi-TRP multi-panel scenario. For example, in the existing group based beam reporting and non-group based beam reporting, the terminal does not know which TRP the CSI-RS in the CSI measurement set comes from. Therefore, the two or at most four reported beams may be sent by the same TRP or different TRPs. For example, in a TRP transmission scenario, the beams reported by the terminal according to a maximum value of L1-RSRP may come from the same TRP all the time, namely it's a measurement result suitable for single TRP transmission, and therefore, an effective measurement result cannot be provided for multi-TRP transmission.

In view of this, the present application provides a measurement reporting method, and may realize a beam measurement reporting method under a multi-TRP scenario through the method, so that the terminal may report a required measurement result that is conducive to simultaneous transmission of the multi-TRP.

Please refer to FIG. 1, FIG. 1 is a schematic flow chart of a measurement reporting method in embodiments of the present application.

Step 101: a QCL-Type D parameter and a measurement set for each CSI-RS group used for measurement are determined according to a configuration of a network side device.

In the embodiments of the present application, the network side device may configure one CSI resource setting for a terminal, and may also configure two CSI resource settings for the terminal, so that the terminal may determine the QCL-Type D parameter and the measurement set for each CSI-RS group used for measurement based on the configuration of the network side device.

It needs to be noted that, in all embodiments of the present application, the CSI resource setting may be configured with a plurality of CSI-RS resource sets (CSI resource sets), and each CSI-RS resource set is one CSI-RS resource group. Or, one CSI resource setting may be configured with one CSI-RS resource set, one CSI-RS resource set is configured with a plurality of CSI-RS resource subsets, and each CSI-RS resource subset is one CSI-RS resource group; or, one CSI resource setting may be configured with one CSI-RS resource set, one CSI-RS resource set contains a plurality of CSI-RS resources, and the plurality of CSI-RS resources are implicitly divided into a plurality of CSI-RS resource groups through a higher layer signaling parameter or a group index or a physical cell identity document (ID).

Moreover, for the convenience of description, a CSI-RS resource group is used as an example for illustration below. In an actual implementation process, the measurement reporting method provided by the solution may be expressed based on the aforementioned CSI resource set or CSI resource setting, which is not limited in the present application. In addition, it needs to be noted that, in the embodiments of the present application, the CSI-RS group may be understood as a CSI-RS resource group.

The CSI-RS resource in all embodiments of the present application may also be replaced with a synchronization signal block (SSB) resource, that is, there is a case that the CSI resource setting or CSI resource set includes the resources that are SSBs.

In the embodiments of the present disclosure, when the terminal determines the measurement set for each CSI-RS group used for measurement according to the configuration of the network side device, the terminal may adopt any of the following modes, but not limited to the following modes.
Mode 1.

In an exemplary embodiment, if the network side device configures one CSI resource setting, and the one CSI resource setting includes K CSI-RS groups, when an L1-SINR of an $m^{th}$ CSI-RS group is measured, it is determined that the $m^{th}$ CSI-RS group is used for channel measurement, and other CSI-RS groups except for the $m^{th}$ CSI-RS group are used for interference measurement. Where, m is any value from 0 to K; K is a positive integer not less than 1; and the CSI-RS groups for channel measurement and interference measurement belong to the measurement set.

For example, if K is 4, when the L1-SINR of a second CSI-RS group is measured, it may be determined that the second CSI-RS group is used for channel measurement; and the CSI-RS groups except for the second CSI-RS group among the four CSI-RS groups, namely a first CSI-RS group, a third CSI-RS group and a fourth CSI-RS group are determined for interference measurement.
Mode 2.

In an exemplary embodiment, if the network side device configures one CSI resource setting, and the one CSI resource setting includes K CSI-RS groups, when an L1-RSRP of the $m^{th}$ CSI-RS group is measured, it is determined that the $m^{th}$ CSI-RS group is used for channel measurement. Where, m is any value from 0 to K; K is a positive integer not less than 1; and the CSI-RS group for channel measurement belongs to the measurement set.
Mode 3.

In an exemplary embodiment, if the network side device configures one CSI resource setting, and the one CSI resource setting includes K CSI-RS groups, when an L1-SINR of the $m^{th}$ CSI-RS group is measured, it is determined that the $m^{th}$ CSI-RS group is used for channel measurement and interference measurement. Where, m is any value from 0 to K; K is a positive integer not less than 1; and the CSI-RS group for channel measurement and interference measurement belongs to the measurement set.
Mode 4.

In an exemplary embodiment, if the network side device configures two CSI resource settings, and each CSI resource setting includes K CSI-RS groups, the K CSI-RS groups corresponding to a first CSI resource setting in the two CSI resource settings are determined for channel measurement; and any of the K CSI-RS groups corresponding to a second CSI resource setting in the two CSI resource settings is determined as the CSI-RS group for interference measurement, corresponding to any CSI-RS group, in the first CSI resource setting. Where, m is any value from 0 to K; K is a positive integer not less than 1; and the CSI-RS groups for channel measurement and interference measurement belong to the measurement set.
Mode 5.

In an exemplary embodiment, if the network side device configures two CSI resource settings, and each CSI resource setting includes K CSI-RS groups, an $m^{th}$ CSI-RS group of the first CSI resource setting in the two CSI resource settings is determined for channel measurement, and an $m^{th}$ CSI-RS group corresponding to the second CSI resource setting in the two CSI resource settings is determined as the CSI-RS group for interference measurement for the $m^{th}$ CSI-RS group in the first CSI resource setting. Where, m is any value from 0 to K; K is a positive integer not less than 1; and the CSI-RS groups for channel measurement and interference measurement belong to the measurement set.
Mode 6.

In an exemplary embodiment, if the network side device configures two CSI resource settings, and each CSI resource setting includes K CSI-RS groups, the first CSI-RS group of each CSI resource setting is determined for channel measurement, and the CSI-RS groups except for the first CSI-RS group are used for interference measurement. Where, m is any value from 0 to K; K is a positive integer not less than 1; and the CSI-RS groups for channel measurement and interference measurement belong to the measurement set.

It can be seen that in the embodiments of the present application, the measurement set may include only the CSI-RS group for channel measurement, may also include the CSI-RS group for interference measurement, and may further include the CSI-RS groups for channel measurement and interference measurement at the same time.

In the embodiments of the present disclosure, when the terminal determines the QCL-Type D parameter for each CSI-RS group used for measurement according to the configuration of the network side device, the terminal may adopt any of the following modes, but not limited to the following modes.

Mode 1.

In the embodiments of the present application, if the network side device configures one CSI resource setting, and it is determined that the one CSI resource setting includes K CSI-RS groups, and a CSI-RS resource in each CSI-RS group is configured with one or more QCL-Type D parameters, where K is a positive integer not less than 1, and Z is a positive integer not less than 1, then: a first QCL-Type D parameter configured for each CSI-RS resource may be determined as the QCL-Type D parameter for the CSI-RS resource or for the CSI-RS group which includes the CSI-RS resource used for channel measurement, and the QCL-Type D parameters except for the first QCL-Type D parameter are determined as the QCL-Type D parameters for the CSI-RS resource used for interference measurement. That is to say, when the terminal measures the CSI-RS resource, the QCL of the CSI-RS resource may be assumed to be a sum of all configured QCL-Type D parameters or a union set of all QCL-Type D parameters.

Mode 2.

In an exemplary embodiment, if the network side device configures one CSI resource setting, the one CSI resource setting includes K CSI-RS groups, each CSI-RS group includes Z CSI-RS resources, and a CSI-RS resource in each CSI-RS group is configured with one QCL-Type D parameter, then: the QCL-Type D parameter configured for each CSI-RS resource may be determined as a QCL-Type D parameter for the CSI-RS resource or for the CSI-RS group which includes the CSI-RS resource used for channel measurement; and the QCL-Type D parameters configured for the CSI-RS resources corresponding to other CSI-RS groups except for the group which includes the CSI-RS resource among the K CSI-RS groups may be used as QCL-Type D parameters for the CSI-RS resource used for interference measurement.

Mode 3.

In an exemplary embodiment, if the network side device configures one CSI resource setting, the one CSI resource setting includes K CSI-RS groups, each CSI-RS group includes Z CSI-RS resources, and a CSI-RS resource in each CSI-RS group is configured with one QCL-Type D parameter, then: when an $m^{th}$ CSI-RS group is measured, the QCL-Type D parameter of a $p^{th}$ CSI-RS resource of the $m^{th}$ CSI-RS group is a union set of the QCL-Type D parameter configured for the $p^{th}$ CSI-RS resource and the QCL-Type D parameters configured for the CSI-RS resources corresponding to the CSI-RS groups except for the $m^{th}$ CSI-RS group, where p is any value from 0 to Z, and Z is a positive integer not less than 1.

It needs to be noted that, in the embodiments, the QCL-Type D parameter of the $p^{th}$ CSI-RS resource of the $m^{th}$ CSI-RS group may be the parameter when it is used for channel measurement, and may also be the parameter when it is used for interference measurement, which is not limited in the embodiments.

Mode 4.

In an exemplary embodiment, if the network side device configures one CSI resource setting, the one CSI resource setting includes K CSI-RS groups, each CSI-RS group includes Z CSI-RS resources, and a CSI-RS resource in each CSI-RS group is configured with one QCL-Type D parameter; the QCL-Type D parameter configured for the CSI-RS resource is taken as a QCL-Type D parameter of each CSI-RS resource; and m is any value from 0 to K, and K is a positive integer not less than 1.

It needs to be noted that, in the embodiments, the QCL-Type D parameter configured for the CSI-RS resource may be the QCL-Type D parameter when it is used for channel measurement, and may also be the QCL-Type D parameter when it is used for interference measurement, which is not limited in the embodiments.

Mode 5.

In an exemplary embodiment, if the network side device configures two CSI resource settings, and each CSI resource setting includes K CSI-RS groups, when the CSI-RS resources in an $m^{th}$ CSI-RS group of a second CSI resource setting are measured, the QCL-Type D parameter of corresponding CSI-RS resources in an $m^{th}$ CSI-RS group of a first CSI resource setting is taken as the QCL-Type D parameter of the CSI-RS resources in the $m^{th}$ CSI-RS group of the second CSI resource setting. Where, m is any value from 0 to K; and K is a positive integer not less than 1.

For example, assuming that K is 4, the CSI-RS groups corresponding to the first CSI resource setting are a CSI-RS group A1, a CSI-RS group A2, a CSI-RS group A3 and a CSI-RS group A4 respectively; and the CSI-RS groups corresponding to the second CSI resource setting are a CSI-RS group B1, a CSI-RS group B2, a CSI-RS group B3 and a CSI-RS group B4 respectively, it may be determined that when the CSI-RS group B3 is measured, the QCL-Type D parameter of the CSI-RS group A3 is taken as a QCL-Type D parameter of the CSI-RS group B3.

Mode 6.

In an exemplary embodiment, if the network side device configures two CSI resource settings, and each CSI resource setting includes K CSI-RS groups, when the CSI-RS resources in an $m^{th}$ CSI-RS group of each CSI resource setting are measured, the QCL-Type D parameter of the corresponding CSI-RS resources in the first CSI-RS group of each CSI resource setting is taken as the QCL-Type D parameter of the CSI-RS resources in the $m^{th}$ CSI-RS group; where m is any value from 0 to K, and K is a positive integer not less than 1.

It needs to be noted that, in the embodiments, the QCL-Type D parameter of the corresponding CSI-RS resources in the first CSI-RS group of each CSI resource setting may be taken as the QCL-Type D parameter, used for channel measurement, of the corresponding CSI-RS resources in the first CSI-RS group of each CSI resource setting; and may also be taken as the QCL-Type D parameter, used for interference measurement, of the corresponding CSI-RS resources in the first CSI-RS group of each CSI resource setting, which is not limited in the embodiments.

In the embodiments of the present application, when the CSI-RS group is the CSI-RS group explicitly configured by the network side device, the corresponding CSI-RS resources are two CSI-RS resources having the same sequential value or relative identity values or the same identity value in configurations of two CSI resource settings.

In the embodiments of the present application, when the CSI-RS group is a CSI-RS resource implicit group, the corresponding CSI-RS resources are two CSI-RS resources having the same sequential value after CSI-RS resources in two CSI-RS resource implicit groups are sorted according to identity values from low to high. Where the CSI-RS resource implicit group is CSI-RS resources determined by implicit grouping based on a higher layer parameter or a group index or a physical cell ID contained in each CSI-RS resource.

In the embodiments of the present application, the $m^{th}$ CSI-RS group in the aforementioned implementations may be determined by any of the following modes, but not limited to:

(1) an $m^{th}$ CSI-RS group determined based on a configuration order or identities of CSI resource sets in the CSI resource setting from small to large;

(2) an $m^{th}$ CSI-RS group determined based on an order of identity values of the CSI-RS resources from small to large;

(3) an $m^{th}$ CSI-RS group determined based on an order of higher layer parameter configuration values associated with the CSI-RS resources from small to large; and (4) an $m^{th}$ CSI-RS group determined based on an order of identities of the CSI-RS resources with smallest identities in respective CSI-RS groups from small to large.

It can be seen that in the embodiments of the present application, the $m^{th}$ CSI-RS group may be determined by various modes, various implementation solutions are provided, and the feasibility of the solutions provided in the present application are enhanced.

Step 102: the measurement set is measured based on the QCL-Type D parameter, and N groups of measurement report values are determined, where N is a positive integer not less than 1.

In the embodiments of the present application, the CSI-RS resources may be received according to the determined QCL-Type D parameter, L1-RSRP or L1-SINR measurement values are determined, and then the CRI or SSBRI contained in the N groups of measurement report values are determined according to the L1-RSRP or L1-SINR.

In the embodiments of the present application, the L1-RSRP or L1-SINR measurement values of the K CSI-RS groups corresponding to the CSI-RS resources are sorted from high to low, and the CRI or SSBRI contained in any group of measurement report values in the N groups is determined.

For example, a reported first group of CRI/SSBRI corresponds to the CSI-RS resource having a maximum L1-RSRP or L1-SINR value in each CSI-RS group; and a reported second group of CRI/SSBRI is the CSI-RS resource having a second largest L1-RSRP or L1-SINR value in each CSI-RS group, and so on, so as to determine the reported N groups of measurement values.

In a specific implementation process, a $z^{th}$ group of CRI/SSBRI reported by the terminal is a CSI-RS resource having the $z^{th}$ largest L1-RSRP value in each CSI-RS group. A value of z is any value from 0 to N, and the terminal selects beams, namely the CSI-RS resources, with the maximum L1-RSRP value from K CSI-RS resource implicit groups or CSI resource sets respectively as the first group of measurement report values. Then, the terminal selects beams, namely the CSI-RS resources, with the second largest L1-RSRP value from the K CSI-RS resource implicit groups or CSI resource sets respectively as a second group of measurement results, and so on, until the terminal selects beams (CSI-RS resources) with an $N^{th}$ largest L1-RSRP value from the K CSI-RS resource implicit groups or CSI resource sets respectively as an $N^{th}$ group of measurement results. An $m^{th}$ (k=1, 2, . . . , and K) measurement value of each group of measurement results is from an $m^{th}$ (k=1, 2, . . . , and K) CSI-RS resource implicit group or CSI resource set. If one CSI-RS resource is associated with a plurality of CSI-RS resource implicit groups or CSI resource sets, for example, one CSI-RS resource is associated with $k1^{th}$ and $k2^{th}$ CSI-RS resource implicit groups or CSI resource sets, the measurement result corresponding to the CSI-RS resource may appear in $k1^{th}$ and $k2^{th}$ positions of each group of measurement results during reporting. The reporting method in this method may also be called inter-group reporting.

In the embodiments of the present application, L1-RSRP or L1-SINR report values included in a single CSI-RS group corresponding to the CSI-RS resources may further be sorted, and the CRI or SSBRI contained in any group of measurement report values in the N groups is determined based on the maximum L1-RSRP or L1-SINR value in each CSI-RS group.

For example, a reported first group of CRI/SSBRI is the CSI-RS resources having a maximum L1-RSRP or L1-SINR value in a certain CSI-RS group; and a reported second group of CRI/SSBRI is the CSI-RS resources having a second largest L1-RSRP or L1-SINR value in a certain CSI-RS group, and so on, so as to determine the reported N groups of measurement report values.

It can be seen that in the embodiments of the present disclosure, the CSI-RS resources corresponding to all maximum L1-RSRP or L1-SINR values in the K groups may be taken as a group of measurement report values, that is, the measurement report values are determined by an inter-group reporting mode; and the CSI-RS resources corresponding to the maximum L1-RSRP or L1-SINR value in any group among the K groups may also be taken as a group of measurement report values, that is, the measurement report values are determined by an intra-group reporting mode. The embodiments of the present application provide the specific implementations of the intra-group reporting mode and the inter-group reporting mode, and the feasibility of the solution is enhanced.

In a specific implementation process, the reported $z^{th}$ group of CRI/SSBRI is the CSI-RS resources having top M L1-RSRP values in a $z^{th}$ CSI-RS group, where n belongs to any value from 0 to N. For example, when N=K, a first group of report values corresponds to the CRI/SSBRI corresponding to M CSI-RS resources with larger L1-SINR values in the first CSI-RS resource implicit group or CSI resource set, namely the CSI-RS group, configured by the network device side; and a second group of report values corresponds to the CRI/SSBRI corresponding to M CSI-RS resources with larger L1-SINR values in a second CSI-RS group configured by the network device side, and so on, until it is determined that an $N^{th}$ group of report values corresponds to the CRI/SSBRI corresponding to M CSI-RS resources with larger L1-SINR values in an $N^{th}$ CSI-RS group configured by the network device side. When N<K, the terminal may further select N groups with relative larger values of the L1-RSRP for reporting. For example, the N groups are selected according to sorting of the largest N values of L1-SINR in a group, or the N groups are selected according to sorting of the $M^{th}$ largest L1-RSRP in each group. The reporting method in this method may also be called intra-group reporting. At this time, it is necessary to require N<=K, and M<=P. Where P is a positive integer not less than 1.

In the embodiments of the present application, N groups of measurement report values may further be determined according to indication information of the network side device. Specifically, if the indication information indicates that: the terminal determines to report measurement values in the CSI-RS groups, the N groups of measurement report values include the CRI or SSBRI contained in each group of measurement report values determined based on sorting of the L1-RSRP or L1-SINR report values included in the K CSI-RS groups corresponding to the CSI-RS resources from high to low.

Specifically, if the indication information indicates that: the terminal determines to report the measurement values among the CSI-RS groups, the N groups of measurement report values include the CRI or SSBRI contained in each group of measurement report values determined based on sorting of the L1-RSRP or L1-SINR report values included in a single CSI-RS group corresponding to the CSI-RS resources and based on a maximum L1-RSRP or L1-SINR value in each CSI-RS group.

In one embodiment, when the network side device does not configure or indicate the terminal to perform intra-group reporting or inter-group reporting, the terminal adopts inter-group measurement value for reporting by default, namely, reporting as described earlier. In one embodiment, the terminal may indicate reporting of this time is intra-group reporting or inter-group reporting during reporting.

In the embodiments of the present application, the terminal may first determine CSI-RS resource pairs that meet a condition, so as to determine N groups of measurement report values in the determined CSI-RS resource pairs. In one embodiment, this step may be executed before step 101. In the embodiments of the present application, the CSI-RS resource pairs that meet the condition may be determined by the following modes, but not limited to the following modes.
Mode A.

In the embodiments of the present application, the terminal may determine that resources in different CSI-RS resource groups can be received simultaneously according to a predefined rule, or resources in the same CSI-RS resource group can be received simultaneously, to determine a set of CSI-RS resource pairs that can be received simultaneously.
Mode B.

In the embodiments of the present application, the terminal may determine an association relationship between each QCL-Type D parameter and the terminal reception spatial filter, where the association relationship is determined by the terminal based on the previous measurement results. Moreover, when two CSI-RS resources are received, different antenna panels or antenna groups are used to simultaneously receive the two CSI-RS resources and an expected measurement result determined based on the QCL-Type D parameters of the two CSI-RS resources and the association relationship is obtained, and then it may be determined that the two CSI-RS resources can be received simultaneously, to determine the set of the CSI-RS resource pairs that can be received simultaneously.
Mode C.

In the embodiments of the present application, when the network side device configures the terminal to perform inter-group reporting or the terminal does not receive the configuration of the network side device, it's determined that inter-group reporting is performed, and the terminal respectively selects specific CSI-RS resources that can be received simultaneously among the K CSI-RS resource groups, or, when the network side device configures the terminal to perform intra-group reporting, the terminal selects specific CSI-RS resources that can be received simultaneously in each CSI-RS resource group, to determine the set of the CSI-RS resource pairs that can be received simultaneously.

For example, it is assumed that beams (namely the CSI-RS resources) contained in the first CSI-RS resource implicit group or CSI resource set are [a1, a2, . . . , and a4]; and beams (CSI-RS resources) contained in the second CSI-RS resource implicit group or CSI resource set are [b1, b2, . . . , and b4].

If the terminal determines to perform inter-group reporting, according to the implementation of the terminal or the configuration of the network side device, it is determined that group beam pairs that can be simultaneously received are [a1, b1], [a1, b2], [a2, b1], [a3, b3], [a3, b4], [a4, b2], and [a4, b4]. Specifically, it may be determined that any two group beam pairs can be simultaneously received according to the predefined rule, that is, there are at most 4*4=16 beam pairs. In addition, it may further be considered that [ai, bj] and [bj, ai] are different beam pairs, and at this time, a value of the beam pairs that may be simultaneously received by the terminal is twice the value determined above.

If the terminal determines to perform intra-group reporting, according to the implementation of the terminal or the configuration of the network side device, it is determined that intra-group beam pairs that are simultaneously received are [a1, a3], [a1, a4], [a2, a3], [a2, a4], [a3, a4], [a4, a1], [b1, b4], and [b2, b4]. It may be determined that any two intra-group beam pairs can be simultaneously received according to the predefined rule, or that any two intra-group beam pairs cannot be simultaneously received, namely, there is 0 pair. In addition, it may further be considered that [ai, aj] and [aj, ai] are different beam pairs, and [bi, bj] and [bj, bi] are different beam pairs.

In the embodiments of the present application, after determining a set of the CSI-RS resource pairs that can be simultaneously received, beam pairs (namely the CSI-RS resource pairs) contained during reporting may be determined based on the set of the CSI-RS resource pairs that can be simultaneously received, so that the reported N groups or N beam pairs are not completely the same.

In a possible implementation, the terminal may determine a CSI-RS resource of an $s^{th}$ L1-RSRP in the set of the CSI-RS resource pairs that can be simultaneously received as a first measurement report value in an $s^{th}$ group of measurement report values, and determine a CSI-RS resource of the $s^{th}$ L1-RSRP in the set of the CSI-RS resource pairs that can be received simultaneously with a first CSI-RS resource as a second measurement report value in the $s^{th}$ group of measurement report values.

Specifically, in the set of the CSI-RS resource pairs that can be simultaneously received, a first measurement report value and a second measurement report value in each $s^{th}$ group may be taken as the N groups of measurement report values, where s is a sequence number determined based on values of the L1-RSRP.

In a specific implementation process, the sequence number may be determined for the values of the L1-RSRP, where the values of the L1-RSRP may be CSI-RS resources of the L1-RSRP values in all CSI-RS resource implicit groups or CSI resource sets, and may also be defined as L1-RSRP values on the CSI-RS resources in the first CSI-RS resource implicit group or CSI resource set, which is not limited in the embodiments of the present application. Specifically, the sequence number of the maximum value of the L1-RSRP may be determined as 1, the sequence number of the second largest value of the L1-RSRP may be determined as 2, and so on, to determine the corresponding sequence numbers of the L1-RSRP values.

It can be seen that when s is 1, the first group of measurement report values are the CSI-RS resources corresponding to the maximum value of the L1-RSRP. That is to say, the terminal determines a first CSI-RS resource of the first group of measurement report values as the beam having the maximum L1-RSRP in the set of the CSI-RS resource pairs that can be simultaneously received, and a second CSI-RS resource as the beam having the maximum L1-RSRP in the set of the CSI-RS resource pairs that can be received by the terminal simultaneously together with the first CSI-RS resource; and after determining the first group of measurement report values, this CSI-RS resource pair is deleted from the set of the CSI-RS resource pairs that can be simultaneously received. Specifically, when the second group of measurement report values are determined, the used method is the same as that of determining the first group of measurement report values, but the reported second group of measurement report values are determined in an updated set of the CSI-RS resource pairs that can be simultaneously received after deleting the first group of CSI-RS resource pairs, and so on, to determine the measurement report values.

In a possible implementation, in the set of the CSI-RS resource pairs that can be simultaneously received, sequential values determined by values corresponding to sums of L1-RSRPs of two CSI-RSs in respective CSI-RS resource pairs from high to low may further be determined. Then, according to the sequential values, each of groups of measurement report values in one-to-one correspondence with the sequential values is determined, and the N groups of measurement report values are determined based on measurement report values corresponding to all CSI-RS resource pairs, where T is a positive integer less than N. Specifically, the terminal selects a CSI-RS resource pair with the maximum sum of the L1-RSRPs of two CSI-RSs in one CSI-RS resource pair from a set S (S is the CSI-RS resource pairs that meet the condition) as the first group of measurement report values, selects a CSI-RS resource pair with the second largest sum of the L1-RSRPs of two CSI-RSs in one CSI-RS resource pair from S as the second group of measurement report values, and so on, until the N group of measurement report values are selected.

It can be seen that in the embodiments of the present application, in order to reduce feedback overhead, when the determined CSI-RS resource pair is [bj, ai], it may further be adjusted to be [ai, bj] during actual reporting. That is, the first CSI-RS resource comes from the CSI-RS resource implicit group having a small identity value or higher layer parameter value, or the CSI resource set having a small CSI resource set index.

That is to say, it may be ensured that the N CSI-RS resource pairs, namely the measurement report values, reported by the terminal are not completely the same, so that more beam information may be provided in one-time reporting, and the feedback overhead is reduced.

In the embodiments of the present application, after determining the N groups of measurement report values, differences corresponding to the N groups of measurement values may be determined according to the N groups of measurement report values, a report format of the N groups of measurement report values is determined based on the differences, and the N groups of measurement report values are reported to the network side device with the report format.

In the embodiments of the present application, after determining the N groups of measurement report values, differences corresponding to the N groups of measurement values may be determined, and it is determined that the report format of the N groups of measurement report values is an intra-group difference format or an inter-group difference format according to the differences.

In the embodiments of the present application, the differences corresponding to the N groups of measurement values may be determined by the following modes, but not limited to the following modes.

Mode 1.

In an exemplary embodiment, it is determined that second to $w^{th}$ measurement report values included in each group of measurement report values among the N groups of measurement report values are all differences from a first measurement report value in the group, where w is a positive integer not less than 2.

Mode 2.

In an exemplary embodiment, it is determined that a first group of measurement report values among the N groups of measurement report values are L1-RSRP values or L1-SINR values obtained by measuring, and a difference between a $r^{th}$ measurement report value in a $q^{th}$ group of measurement report values except for the first group of measurement report values and a $r^{th}$ measurement report value in the first group of measurement report values is determined, where r is any value from 0 to w.

Mode 3.

In an exemplary embodiment, it is determined that a first measurement report value in the first group among the N groups of measurement report values is an L1-RSRP value or L1-SINR value obtained by measuring, and the measurement report values except for the first measurement report value in the first group and the measurement report values except for the first group are differences from the first measurement report value of the first group of measurement report values, where r is any value from 0 to w.

Mode 4.

In an exemplary embodiment, it is determined that the first measurement report value in the first group among the N groups of measurement report values is an L1-RSRP value or L1-SINR value obtained by measuring, and other measurement report values except for the first measurement report value in the first group are differences from the first measurement report value in the first group of measurement report values, where r is any value from 0 to w.

In the embodiments of the present application, the N groups of measurement report values may be reported to the network side device in the intra-group difference report format or the inter-group report format through a physical uplink control channel (PUCCH) or a physical uplink shared channel (PUSCH).

In a specific implementation process, assuming that the measurement report values reported by the terminal are four groups, and each group includes two measurement values, that is, eight L1-RSRP values reported by the terminal are RSRP #1, RSRP #2, RSRP #3, RSRP #4, RSRP #5, RSRP #6, RSRP #7, and RSRP #8 respectively; and similarly, in the L1-SINR reporting, eight report values are SINR #1, SINR #2, SINR #3, SINR #4, SINR #5, SINR #6, SINR #7, and SINR #8 respectively.

Specifically, in difference reporting, one or more (such as top one or more) measurement values adopt a direct reporting mode, that is, one or more aforementioned measurement values are directly reported, and the measurement values may be called non-difference measurement values; and other measurement values except for the non-difference measurement values adopt difference reporting, and the measurement values may be called difference measurement values. Specifically, the measurement values directly reported are quantified by using a bits, and the difference measurement values are quantified by using b bits. For example, a=7, and b=4.

However, in one-time reporting, if the measurement values directly reported, namely the non-difference measurement values, and the measurement values differentially reported, namely the difference measurement values, do not appear in a fixed position, a base station cannot interpret each measurement value correctly.

For example, assuming that the RSRP #1 is quantified by using 7 bits, other RSRPs are quantified by using 4 bits, and the CRI/SSBRI is 32 bits in total, the terminal reports 67 bits in one-time reporting. Then after receiving uplink control information (UCI) reported by the terminal, the base station may determine that first 32 bits represent the CRI/SSBRI, for example, each CRI/SSBRI is 4 bits, with a total of 8 CRI/SSBRIs; the $33^{rd}$ to $39^{th}$ bits correspond to the RSRP #1; the $40^{th}$ to $43^{rd}$ bits correspond to the RSRP #2, . . . , and so on. If the measurement value of the RSRP #2 in a certain report is the largest, it adopts the direct reporting mode, while other measurement values adopt the difference reporting mode, the base station still receives 67 bits, and it is interpreted according to a method of Rel-15, that is, it is considered that first 32 bits represent CRI/SSBRI, the $33^{rd}$ to $39^{th}$ bits correspond to the RSRP #1, the $40^{th}$ to $43^{rd}$ bits correspond to the RSRP #2, . . . , and so on. This mode leads to incorrect interpretation of the RSRP #1 and RSRP #2.

Based on the aforementioned problem, in the embodiments of the present application, when the N groups of measurement report values are reported to the network side device by the difference reporting mode, for example, the N groups of measurement values are reported to the network side device in the intra-group difference report format or the inter-group report format, the corresponding design is further provided for the reporting mode, so that the base station may correctly interpret the uplink control information, and then obtain the N groups of measurement report values accurately.

In the embodiments of the present application, difference reporting may be performed by the following modes, but not limited to the following modes.

Mode 1.

In the embodiments of the present application, when the report format is intra-group difference, and when the N groups of measurement report values are reported, predefined T bits added in the UCI indicate a position where a non-difference measurement value appears in a group; and the non-difference measurement value represents a maximum measurement value in one group.

In one embodiment, if it is determined that the report format is intra-group difference, that is, it is determined that measurement values except for an $i^{th}$ measurement value in each group of the N groups of measurement report values are all differentiated from the $i^{th}$ measurement value in this group, and i is a positive integer larger than or equal to 1.

Specifically, M measurement values in each group of the N groups of measurement report values correspond to K CSI-RS resource groups respectively; and when M=K, the M measurement values of each group are in one-to-one correspondence with the K CSI-RS resource groups.

In the embodiments of the present application, when the N groups of measurement report values are reported, the predefined T bits added in the UCI may indicate a position where a non-difference measurement value appears in a group.

Specifically, T of the predefined T bits is determined based on the following formula:

$$T=N\lceil \log_2 M\rceil,$$

where, N represents the number of the groups of the measurement report values, M represents the number of the measurement report values in each group, and $\lceil \ \rceil$ represents an operator for rounding up.

For example, when N=4, and M=2, it is determined that T is 4, that is, 4 bits are added in the uplink control information, and each bit indicates the position where a non-difference measurement value appears in one group. For example, 1 and 0 represent that the non-difference measurement values appear in a first or second measurement value in the group respectively. For another example, when N=4, and M=4, it is determined that T is 8, that is, 8 bits are added in the uplink control information, every 2 bits correspond to the appearing position of a non-difference measurement value in the group, that is, one code point (00, 01, 10 or 11) corresponds to one appearing position.

In the embodiments of the present application, the position of the added T bits may be after the CRI/SSBRI and/or the L1-RSRP/L1-SINR, or before the CRI/SSBRI and/or the L1-RSRP/L1-SINR, or before or after each group of reported CRI, or before or after each group of reported L1-RSRP/L1-SINR, which is not limited in the embodiments of the present application.

For example, the added T bits appear before the CRI/SSBRI and/or the L1-RSRP, and when N=4, and M=2, the reported format is shown in Table 1:

TABLE 1

| CSI reporting number | CSI field |
| --- | --- |
| CSI reporting #n | Indication of appearing positions of difference measurement values |
| | CRI or SSBRI #1, if reported |
| | CRI or SSBRI #2, if reported |
| | CRI or SSBRI #3, if reported |
| | CRI or SSBRI #4, if reported |
| | CRI or SSBRI #5, if reported |
| | CRI or SSBRI #6, if reported |
| | CRI or SSBRI #7, if reported |
| | CRI or SSBRI #8, if reported |
| | RSRP #1, if reported |
| | RSRP #2, if reported |
| | RSRP #3, if reported |
| | RSRP #4, if reported |
| | RSRP #5, if reported |
| | RSRP #6, if reported |
| | RSRP #7, if reported |
| | RSRP #8, if reported |

Where numbers #1 and #2 are a first group, numbers #3 and #4 are a second group, numbers #5 and #6 are a third group, numbers #7 and #8 are a fourth group, and each bit indicates a position where a difference measurement value appears in one group. For example, indication of appearing positions of the difference measurement values is 0110, and it may be determined that a second measurement value in the first group, a first measurement value in the second group, a first measurement value in the third group and a second measurement value in the fourth group are the difference measurement values, namely the corresponding RSRP #2, RSRP #3, RSRP #5, and RSRP #8.

Mode 2.

In the embodiments of the present application, when the N groups of measurement report values are reported, predefined T bits added in the UCI indicate a position where a difference measurement value appears in a group, where T is correspondingly determined based on the number of groups of measurement report values and the number of the measurement report values in each group.

In one embodiment, it is determined that a $j^{th}$ measurement value of each group (except for an $i^{th}$ group) in the N groups of measurement report values is differentiated from a $j^{th}$ measurement value of the $i^{th}$ group, where j=1, 2, . . . , and M, and i=1, 2, . . . , and N.

In the embodiments of the present application, T may be determined based on the following formula:

$$T=M\lceil \log_2 N\rceil,$$

where, N represents the number of the groups of the measurement report values, M represents the number of the measurement report values in each group, and ⌈ ⌉ represents an operator for rounding up.

Similar to the method in mode 1, the $M\lceil \log_2 N\rceil$ bits are added to represent the appearing positions of the difference measurement values, and the added bits may appear after the CRI/SSBRI and/or the L1-RSRP/L1-SINR. For example, when N=2, and M=2, it may be determined that a first predefined number is 2, that is, two bits are added, and the two bits respectively represent for which group the first measurement value and the second measurement value are differentiated. Further, when it is determined that two bits are added, and if one of the two bits is 0, and the other is 1, then the bit of 0 represents differentiating for the first group, and the bit of 1 represents differentiating for the second group; and when the two bits are both 0, it is represented that a first measurement value of each group is differentiated for the first measurement value of the first group, and the second measurement value of each group is differentiated for the second measurement value of the first group.

For another example, when N=4, and M=2, it may be determined that the first predefined number is 4, that is, four bits are added, and the bits also respectively represent for which group the first measurement value and the second measurement value are differentiated, for example, every two bits represent a difference position of one measurement value. For example, the four bits are 0110 respectively, and it may be determined that 01 represents that the first measurement value is differentiated for the second group, and 10 represents that the second measurement value is differentiated for the third group.

Mode 3.

In the embodiments of the present application, when the report format is inter-group difference, and when the N groups of measurement report values are reported, T bits added in the UCI indicate positions where difference measurement values appear; and the difference measurement values represent measurement values except for the maximum measurement value in one group.

Specifically, inter-group difference specifically refers to that the measurement values except for the first measurement value of the first group, and the measurement values except for the first group are all differentiated from the first measurement value of the first group. In addition, the inter-group difference mode may be further expanded as: the measurement values except for the first measurement value of the first group, and the measurement values except for the first group are all differentiated from the second measurement value of the first group.

For example, T is 1; when the bit is 0, it represents differentiating for the second measurement value of the first group; and when the bit is 1, it presents differentiating for the first measurement value of the first group.

It needs to be noted that in implementations of the above mode 1, mode 2 and mode 3, there is a fixed association relationship between each group of measurement report values and the CSI-RS resource groups, that is, when the L1-RSRP is reported, a plurality of L1-RSRP values are arranged in a fixed order all the time, for example, as mentioned above, when N=4, and M=2, RSRP #1, RSRP #2, RSRP #3, RSRP #4, RSRP #5, RSRP #6, RSRP #7, and RSRP #8 correspond to the first, second, first, second, first, second, first, and second CSI-RS resource groups respectively. Similarly, values of the CRI/SSBRI or the L1-RSRP are also arranged in a fixed order all the time.

Mode 4.

In the embodiments of the present disclosure, when the report format is intra-group difference or inter-group difference, and when the N groups of measurement report values are reported, the predefined number of bits in the UCI indicates an association relationship between the measurement value and the CSI-RS resource groups, or whether corresponding CSI-RS resource groups change in order.

Exemplarily, the predefined number of bits may be determined based on the mode for determining the T bits, for example, when N=4, and M=2, it may be determined that a second predefined number is 8. Specifically, the association relationship between each measurement value or the CRI/SSBRI and two CSI-RS resource groups (such as the CSI resource sets) may be indicated in a bitmap mode, for example, 0 represents a first CSI-RS resource group, and 1 represents a second CSI-RS resource group. For example, for the intra-group difference, 01100110 represents that the eight reported measurement values correspond to the first, second, second, first, first, second, second and first CSI-RS resource groups respectively.

Still taking N=4 and M=2 as an example, when the intra-group difference is adopted, each group may adopt 1 bit to indicate whether the measurement values of this group change in order, for example, '1' represents changing in order, and '0' represents not changing in order. For example, originally, two measurement values in each group correspond to the first CSI-RS resource group and the second CSI-RS resource group respectively; and if it is indicated to change in order, it is represented that at present, the first measurement value is the second CSI-RS resource group, and the second measurement value corresponds to the first CSI-RS resource group. In this case, the L1-RSRPs or L1-SINRs in the group are arranged in an order from large to small all the time.

Specifically, for the inter-group difference, 1 bit may also be used for indicating whether the two measurement values of the first group change in order, and the method is similar to that of the intra-group difference. Since other groups are all difference measurement values for one measurement value of the first group and do not need to change in order, so there is no need to indicate order change situations for other groups in this mode.

In the actual implementation process, please refer to Table 2, Table 2 shows a UCI overhead comparison of a plurality of reporting methods, K represents the number of CSI-RS resources or SSB resources in each CSI-RS resource group, and one CSI-RS resource group may be one CSI resource set.

TABLE 2

| Reporting method | K = 64 | K = 32 | K = 16 |
|---|---|---|---|
| Rel. 15 group based beam reporting | 23 | 21 | 19 |
| Rel. 15 non-group based beam reporting N = 4 | 43 | 39 | 35 |

TABLE 2-continued

| Reporting method | K = 64 | K = 32 | K = 16 |
|---|---|---|---|
| Enhanced reporting method, N = 4, and inter-group difference 2 | 83 | 75 | 67 |
| Enhanced reporting method, N = 4, and intra-group difference | 92 | 84 | 76 |
| Enhanced reporting method, N = 4, and inter-group difference 1 | 86 | 78 | 70 |
| Enhanced reporting method, N = 4, and no difference | 104 | 96 | 88 |

It can be seen from Table 2 that after group based beam reporting is supported under the multi-TRP scenario, compared with significant increasing of UCI load in the prior art, embodiments of the present application further provide a solution for reducing UCI load.

In the embodiments of the present application, the number of reported bits of each difference measurement value or each measurement value in the N groups of measurement values may be determined, and then the N groups of measurement values may be reported to the network side device based on the number of reported bits and a predefined report rule.

In one embodiment, it may be considered that the UCI load is reduced by saving L1-RSRP or L1-SINR overhead. Exemplarily, each difference measurement value adopts lower overhead during reporting, that is, the existing 4 bits may be reduced to 0, 1, 2 or 3 bits, namely, the number of reported bits of each difference measurement value in the reported N groups of measurement values may be 0, 1, 2 or 3. Specifically, how many bits the number of reported bits of each difference measurement value in the reported N groups of measurement values is reduced to may be predefined in a protocol, or configured by higher layer signaling, or determined by the terminal itself, which is not limited in the embodiments of the present application.

Exemplarily, the difference measurement value is reported by using 0 bit, that is to say, only direct measurement values are reported during reporting, and the difference measurement values are not reported, namely, the number of reported bits of each difference measurement value in the reported N groups of measurement values is reduced to 0. That is, when N=4, and M=2, and when the intra-group difference is adopted, one beam (the beam reported in a difference mode) in each group only reports the CRI/SSBRI, and the corresponding L1-RSRP or L1-SINR is not reported.

Exemplarily, the difference measurement value is reported by using 1 bit. That is to say, only the direct measurement values are reported during reporting, and only one measurement value is reported for the difference measurement value, namely, the number of reported bits of each difference measurement value in the reported N groups of measurement values is reduced to 1. When the intra-group difference is adopted, for the second to $M^{th}$ beams (CRI/SSBRI) of each group, or beams with the second to $M^{th}$ largest L1-RSRP or L1-SINR values, the corresponding L1-RSRPs or L1-SINRs are reported at a coarser granularity (such as 1 bit), and if a difference between the second beam and the first beam is within XdB, the second beam is 1, otherwise it is 0; and vice versa, for example, the difference is within XdB, the second beam is 0, otherwise it is 1.

In this way, compared to the previous difference reporting mode, overhead of the measurement value corresponding to the beam of each difference may be reduced by 3 bits. In addition, X may be a value predefined in the protocol, such as 8 dB, and may further be a value configured by RRC signaling, which is not limited in the embodiments of the present application.

Exemplarily, the difference measurement value is reported by using 2 or 3 bits, that is to say, the number of reported bits of each difference measurement value in the reported N groups of measurement values is reduced to 2 or 3. In this case, the number of Y differences or threshold values may be configured or predefined; and if the difference measurement values fall within a certain range, the corresponding values are reported.

For example, the number of reported bits of each difference measurement value in the reported N groups of measurement values is 2, and two differences are defined to be Y1 and Y2 respectively. Referring to Table 3, Table 3 shows determined reported values corresponding to the reported number of 2 bits of each difference measurement value in the reported N groups of measurement values.

TABLE 3

| Reported values | Gap with a maximum measurement value |
|---|---|
| 00 | Less than (or equal to) Y1 |
| 01 | Larger than (or equal to) Y1, and less than (or equal to) Y2 |
| 10 | Larger than (or equal to) Y2 |
| 11 | Reserved |

For another example, the number of reported bits of each difference measurement value in the reported N groups of measurement values is still 2, and three differences are defined to be Y1, Y2 and Y3 respectively. Referring to Table 4, Table 4 shows determined reported values corresponding to the reported number of 3 bits of each difference measurement value in the reported N groups of measurement values.

TABLE 4

| Reported values | Gap with a maximum measurement value |
|---|---|
| 00 | Less than (or equal to) Y1 |
| 01 | Larger than (or equal to) Y1, and less than (or equal to) Y2 |
| 10 | Larger than (or equal to) Y2, and less than (or equal to) Y3 |
| 11 | Larger than (or equal to) Y3 |

For another example, the number of reported bits of each difference measurement value in the reported N groups of measurement values is 3, and at most 7 differences (or thresholds) may be defined to be Y1, Y2, Y3, Y4, Y5, Y6 and Y7 respectively. Referring to Table 5, table 5 shows determined reported values corresponding to the reported number of 3 bits of each difference measurement value in the reported N groups of measurement values.

TABLE 5

| Reported values | Gap with a maximum measurement value |
|---|---|
| 000 | Less than (or equal to) Y1 |
| 001 | Larger than (or equal to) Y1, and less than (or equal to) Y2 |
| 010 | Larger than (or equal to) Y2, and less than (or equal to) Y3 |
| 011 | Larger than (or equal to) Y3, and less than (or equal to) Y4 |

TABLE 5-continued

| Reported values | Gap with a maximum measurement value |
| --- | --- |
| 100 | Larger than (or equal to) Y4, and less than (or equal to) Y5 |
| 101 | Larger than (or equal to) Y5, and less than (or equal to) Y6 |
| 110 | Larger than (or equal to) Y6, and less than (or equal to) Y7 |
| 111 | Larger than (or equal to) Y7 |

In one embodiment, it may be further considered that the UCI load is reduced by reducing CRI/SSBRI overhead. For example, when a gap of two beams is larger than ZdB, only the first CRI is reported, otherwise 2 pieces of CRI are reported. Z may be a value predefined in the protocol, such as 8 dB, and may further be a value configured by RRC signaling, which is not limited in the embodiments of the present application. When the gap is too large, it indicates that the quality of the beams reported in the difference mode is poor, which cannot provide services for the terminal; and therefore, the corresponding CRI/SSBRI may be not reported. Similarly, the corresponding L1-RSRP or L1-SINR may also be not reported.

Several possible modes are listed to illustrate the embodiments of measurement reporting below. It should be understood that the following examples are only illustrative description, and do not limit the embodiments of the present application. In addition to the modes listed below, other modes may further be adopted in a specific implementation process, which is not exhaustive herein.

Embodiment 1

In the embodiment, if the network side device configures one CSI resource setting for the terminal, the CSI resource setting includes a plurality of CSI resource sets, each CSI resource setting contains a plurality of CSI-RS resource groups, and each CSI resource set corresponds to one TRP. That is to say, in the embodiment 1, one CSI reporting setting and one CSI resource setting are taken as an example for description.

In a possible implementation, the CSI resource setting may contain a plurality of CSI-RS resources, each CSI-RS resource includes a higher layer parameter related to its corresponding TRP during configuration, for example, the CSI-RS resource contains the higher layer parameter CORE-SETPoolIndex, or a group index, or other higher layer parameters, or a physical cell ID.

It needs to be noted that, there are at most K values of the higher layer parameter, that is, the CSI-RS resources are implicitly divided into K groups, and there are P CSI-RS resources in each group. For example, a value of K is 2, and it represents two TRPs. In this case, the K CSI-RS resource implicit groups may be contained in one CSI resource setting. Under the implicit grouping, it is further supported that one CSI-RS resource is configured with two or more higher layer parameters related to the TRP, for example, two group indexes are configured, or two or more values of one higher layer parameter are contained, such as, the values of the parameter CORESETPoolIndex are 0 and 1. That is, this expression may represent that one CSI-RS resource is associated with two or more TRPs, for example, the TRP1 and the TRP2 both send reference signals on this CSI-RS resource. In one embodiment, two or more QCL-Type D parameters may be configured for this CSI-RS resource.

In addition, it further needs to be noted that, in all embodiments of the present application, it may be assumed that the number of CSI-RS resources in each group is equal. This assumption is only for the convenience of description, that is to say, the methods in the present application may also be expanded to situations where the number of the CSI-RS resources in each group is not equal.

In the embodiment of the present application, if the network side device configures the terminal to perform L1-RSRP measurement reporting, the terminal may determine a measurement reporting behavior of the terminal according to the following method.

Step a: the terminal determines the QCL-Type D parameter on each CSI-RS resource according to the configuration of the network side device, receives the CSI-RS according to the determined QCL-Type D parameter, and measures and determines a receiving power of each CSI-RS, to determine the L1-RSRP values.

In the embodiment of the present application, when the L1-RSRP value corresponding to each CSI-RS resource is measured, the terminal may use each CSI-RS resource group for channel measurement, so that the terminal may directly receive the CSI-RS resources according to the QCL-Type D parameter pre-configured by the network side device for each CSI-RS resource in the CSI-RS resource group for channel measurement, so as to measure the receiving power of each CSI-RS to determine the L1-RSRP values.

In the embodiment of the present application, the CSI resource set further includes other explicit grouping of the CSI-RS, and the specific explicit grouping may be, for example, one CSI resource setting is explicitly configured with two CSI resource sets, or one CSI resource setting contains two CSI resource subsets, or one CSI resource set contains two CSI resource subsets, etc., which is not limited in the embodiment of the present application.

In the embodiment, when the L1-RSRP value corresponding to each CSI-RS resource is measured, the terminal uses each CSI-RS resource implicit group or CSI resource set for channel measurement.

Step b: the terminal determines CRI or SSBRI contained in the N groups of measurement report values.

In the embodiment of the present application, after determining the L1-RSRP values, the terminal may determine the CRI or SSBRI contained in the N groups of measurement report values based on the L1-RSRP values.

Specifically, the mode for determining the measurement report values may refer to the inter-group reporting mode and intra-group reporting mode described in step 102, to determine the measurement report values, which will not be repeated here.

In a specific implementation process, if one CSI-RS resource is associated with a plurality of CSI-RS resource implicit groups or CSI resource sets, such as one CSI-RS resource is associated with first and second CSI-RS resource implicit groups or CSI resource sets, the measurement results corresponding to the CSI-RS resource may appear in first and second positions of each group of measurement results during reporting.

Step c: the terminal determines the L1-RSRP measurement values corresponding to the CRI or SSBRI in the N groups of measurement report values.

In the embodiment of the present application, after determining which L1-RSRPs corresponding to the beams (CRI or SSBRI) need to be reported through step a and step b, the measurement values thereof are quantified and reported. Some of the measurement values are reported by direct quantification, and others are reported by difference quantification with other unquantified measurement values.

It may be determined that second to w$^{th}$ measurement values of each group are all differences with the first measurement value in the group from the reported N groups measurement values, where w is a positive integer not less than 2.

In a possible implementation, in the reported N groups of measurement values, it is determined that a first group of measurement report values among the N groups of measurement report values are L1-RSRP values or L1-SINR values obtained by measuring, and a difference between an r$^{th}$ measurement report value in a q$^{th}$ group of measurement report values except for the first group of measurement report values and an r$^{th}$ measurement report value in the first group of measurement report values is determined. It can be seen that if the inter-group reporting mode is adopted, it may be understood as performing difference among a plurality of beams reported by each TRP.

In a possible implementation, in the reported N groups of measurement values, it is determined that a first measurement report value in the first group among the N groups of measurement report values is an L1-RSRP value or L1-SINR value obtained by measuring, and report values except for the first measurement report value in the first group and report values except for the first group are differences from the first measurement report value of the first group of measurement report values, where r is any value from 0 to w.

In a possible implementation, it is determined that the first measurement report value in the first group among the N groups of measurement report values is an L1-RSRP value or L1-SINR value obtained by measuring, and other report values except for the first measurement report value in the first group are differences from the first measurement report value in the first group of measurement report values, where r is any value from 0 to w.

Step d: the terminal reports the L1-RSRP measurement values corresponding to the CRI or SSBRI in the N groups of measurement report values to the network side device through the PUCCH or the PUSCH.

It needs to be noted that in the embodiment of the present application, if the network side device configures the terminal to perform L1-SINR measurement reporting, the L1-RSRP in all above steps may be replaced with L1-SINR for implementation.

Embodiment 2

In the embodiment, configurations of the CSI reporting setting and the CSI resource setting are the same as those of the embodiment 1, that is, the network side device configures one CSI reporting setting for the terminal, and this CSI reporting setting corresponds to one CSI resource setting. The CSI resource setting contains K CSI resource sets, namely K CSI-RS groups, each CSI resource set contains P CSI-RS resources, and each CSI resource set corresponds to one TRP, that is, it is sent by the corresponding TRP or used for the terminal to measure the channel or interference of the corresponding TRP. Or, the CSI resource setting contains K*P CSI-RS resources, and each CSI-RS resource has a higher layer parameter related to the TRP during configuration, for example, the CSI-RS resource contains the higher layer parameter CORESETPoolIndex or a group index or other higher layer parameters, where there are at most K values of this higher layer parameter, that is, the CSI-RS resources are implicitly divided into K groups, and there are P CSI-RS resources in each group. For example, a typical value of K is 2, which represents two TRPs. Under the implicit grouping, it is further supported that one CSI-RS resource is configured with two or more higher layer parameters related to the TRP, for example, two group indexes are configured, or two or more values of one higher layer parameter are contained, such as, the values of the parameter CORESETPoolIndex are 0 and 1. In this case, it is represented that one CSI-RS resource is associated with two or more TRPs, for example, the TRP1 and the TRP2 both send reference signals on the CSI-RS resource. In one embodiment, two or more QCL-Type D parameters may be configured for the CSI-RS resource.

In the embodiment, the L1-SINR reported by the terminal uses each CSI-RS resource implicit group or CSI resource set for channel measurement and interference measurement. That is, one CSI-RS resource implicit group or CSI resource set is used for channel measurement, and may also be used for interference measurement. In this case, the measured interference cases are a set of interferences experienced by the terminal, namely all interferences. The embodiment provides a measurement method for measuring the specific interference (such as interference between cells or TRPs). It needs to be noted that, in the embodiment of the present application, one CSI-RS resource implicit group or CSI resource set is referred to as one CSI-RS group for short.

Please refer to FIG. 2, in which a situation that a CSI-RS group 1 and a CSI-RS group 2 are associated with the TRP1 and the TRP2 respectively is taken as an example, that is, the TRP 1 sends the reference signals on the CSI-RS resources in the CSI-RS group 1, and the TRP2 sends the signals on the CSI-RS resources in the CSI-RS group 2.

In a specific implementation process, when the TRP1 sends the reference signals on the CSI-RS resources in the CSI-RS group 1, it will generate interference on the terminal receiving the signals on the TRP2. Similarly, when the TRP2 sends the reference signals on the CSI-RS resources in the CSI-RS group 2, it will generate interference on the terminal receiving the signals on the TRP1. Therefore, during L1-SINR measurement, the terminal may perform channel measurement of the TRP1 and interference measurement of the TRP2 according to the CSI-RS group 1, and perform channel measurement of the TRP2 and interference measurement of the TRP1 according to the CSI-RS group 2.

In the embodiment, a specific measurement reporting method is step f: the terminal determines the QCL-Type D parameter on each CSI-RS resource according to the configuration of the network side device, receives the CSI-RS according to the determined QCL-Type D parameter, and measures and determines a receiving power of each CSI-RS, to determine the L1-SINR values.

Specifically, the L1-SINR values may be determined by the following two modes, but not limited to the following two modes.

Mode 1.

In the embodiment, taking K=2 as an example, the network side device configures two QCL-Type D parameters for each CSI-RS resource in the CSI-RS group 1 and the CSI-RS group 2; and it is assumed that a first QCL-Type D parameter represents the QCL for the CSI-RS resource used for channel measurement, and a second QCL-Type D parameter represents the QCL for the CSI-RS resource used for interference measurement.

In a specific implementation process, the terminal may use the CSI-RS group 1 for channel measurement and the CSI-RS group 2 for interference measurement, and in this case, the interference of the TRP2 on the TRP1 may be measured. Specifically, it is assumed that the number of the CSI-RS resources in the CSI-RS group 1 is equal to the number of the CSI-RS resources in the CSI-RS group 2.

It needs to be noted that in all embodiments of the present application, the CSI-RS resource includes the non-zero power (NZP) CSI-RS resource and SSB.

In a specific implementation process, for one CSI-RS resource in the CSI-RS group 1, during measurement, the terminal may use the first QCL-Type D parameter configured by the network side device on the CSI-RS resource to receive and measure the CSI-RS resource as one channel measurement value (such as marked as M1) of the TRP corresponding to the first CSI-RS group. At the same time, the second QCL-Type D parameter configured by the network side device may be used to receive and measure the CSI-RS resource as one interference measurement value (such as marked as M2) of the TRP corresponding to the second CSI-RS group.

In a specific implementation process, the same or similar mode is adopted for one corresponding CSI-RS resource in the CSI-RS group 2, namely the CSI-RS resource corresponding to the measured CSI-RS resource in the CSI-RS group 1. During measurement, the terminal uses the first QCL-Type D parameter configured by the network side device on the CSI-RS resource to receive and measure the CSI-RS resource as one channel measurement value (such as marked as M3) of the TRP corresponding to the second CSI-RS group. At the same time, the second QCL-Type D parameter configured by the network side device is used to receive and measure the CSI-RS resource as one interference measurement value (such as marked as M4) of the TRP corresponding to the first CSI-RS group.

In the embodiment, when the terminal measures the L1-SINR values on the TRP corresponding to the first CSI-RS group, the measurement values M1 and M4 are used. In order to determine the interference case more accurately based on the M4, it may be assumed that the QCL-Type D parameters during channel measurement and interference measurement are the same, that is, the second QCL-Type D parameter of the CSI-RS in the CSI-RS group 2 and the first QCL-Type D parameter of the corresponding CSI-RS in the CSI-RS group 1 are configured into the same value.

Specifically, by adopting the same mode, when the terminal measures the L1-SINR values on the TRP corresponding to the second CSI-RS group, the measurement values M3 and M2 are used; and in order to determine the interference case more accurately based on the M2, it may be assumed that the QCL-Type D parameters during channel measurement and interference measurement are the same, that is, the second QCL-Type D parameter of a CSI-RS in the CSI-RS group 1 and the first QCL-Type D parameter of the corresponding CSI-RS in the CSI-RS group 2 are configured into the same value.

It needs to be noted that in all embodiments of the present application, during L1-SINR measurement, if the CSI-RS group is a CSI resource set or an explicitly configured CSI-RS group, the corresponding CSI-RS resources refer to two CSI-RS resources having the same sequential value in the configuration of two CSI resource sets. For example, a fourth CSI-RS resource configured in the first CSI-RS resource set corresponds to a fourth CSI-RS resource configured in the second CSI-RS resource set. Specifically, if the CSI-RS group is a CSI-RS resource implicit group, the corresponding CSI-RS resources are two CSI-RS resources having the same sequential values after CSI-RS resources in two implicit groups are sorted according to the identity values from low to high. The two CSI-RS resource implicit groups are two CSI-RS resource implicit groups in the same CSI resource setting, and may also be two CSI-RS resource implicit groups in different CSI resource settings.

Mode 2.

Similarly taking K=2 as an example, the network side device configures one QCL-Type D parameter for each CSI-RS resource in the CSI-RS group 1 and the CSI-RS group 2; and when each CSI-RS resource is measured, the terminal uses the QCL-Type D parameter configured by the network side device to perform channel measurement, and meanwhile uses a predefined QCL-Type D parameter to perform interference measurement.

In the embodiment, the terminal may use the CSI-RS group 1 for channel measurement and the CSI-RS group 2 for interference measurement, and then the interference of the TRP2 on the TRP1 may be measured. Specifically, it is assumed that the number of the CSI-RS resources in the CSI-RS group 1 is equal to the number of the CSI-RS resources in the CSI-RS group 2.

In the embodiment, for one CSI-RS resource in the CSI-RS group 1, during measurement, the terminal uses the QCL-Type D parameter configured by the network side device on the resource to receive and measure the CSI-RS resource as one channel measurement value (such as marked as M1) of the TRP corresponding to the first CSI-RS group. At the same time, the terminal uses the QCL-Type D parameter configured for the corresponding CSI-RS resource in the CSI-RS group 2 to receive and measure the CSI-RS resource as one interference measurement value (such as marked as M2) of the TRP corresponding to the second CSI-RS group.

Specifically, the same mode is adopted for the corresponding CSI-RS resource in the CSI-RS group 2, namely the CSI-RS resource corresponding to the measured CSI-RS resource in the CSI-RS group 1. During measurement, the terminal uses the QCL-Type D parameter configured by the network side device on the resource to receive and measure the CSI-RS resource as one channel measurement value (such as marked as M3) of the TRP corresponding to the second CSI-RS group. At the same time, the terminal uses the QCL-Type D parameter configured for the corresponding CSI-RS resource in the CSI-RS group 1 to receive and measure the CSI-RS resource as one interference measurement value (such as marked as M4) of the TRP corresponding to the first CSI-RS group.

Specifically, when measuring the L1-SINR values on the TRP corresponding to the CSI-RS group 1, the terminal uses the measurement values M1 and M4 to determine the L1-SINR values jointly. In addition, when measuring the L1-SINR values on the TRP corresponding to the CSI-RS group 2, the terminal uses the measurement values M3 and M2 to determine the L1-SINR values jointly.

In the embodiment, the network side device may further configure or indicate some assumptions or limitations of the terminal during measurement, for example, the same or different panels are used to receive two CSI-RS resource implicit groups or CSI resource sets or the CSI-RS resources; or the same or different space reception filters are used to receive two CSI-RS resource implicit groups or CSI resource sets or the CSI-RS resources; or whether the terminal performs superimposition processing or interference processing on the CSI-RS group 2 when measuring the CSI-RS group 1 is indicated. Similarly, whether the terminal performs superimposition processing or interference processing on the CSI-RS group 1 when measuring the CSI-RS group 2 may be indicated.

In a case that the network side device configures or does not configure the above assumptions or limitations, the terminal may further report the above measurement assumptions or limitations while reporting the measurement result.

Step g: the terminal determines the CRI or SSBRI contained in the N groups of measurement report values.

In the embodiment, the terminal determines the CRI or SSBRI contained in the reported N groups of measurement values according to the method in step b in the embodiment 1, which will not be repeated here.

Step h: the terminal determines the L1-RSRP measurement values corresponding to the CRI or SSBRI in the N groups of measurement report values.

In the embodiment, the terminal determines the measurement values according to the mode for determining the differences in step c in the embodiment 1. Specifically, the L1-RSRP in step c in the embodiment 1 may be replaced with the L1-SINR for processing, which will not be repeated here.

Step i: the terminal reports the L1-RSRP measurement values corresponding to the CRI or SSBRI in the N groups of measurement report values to the network side device through the PUCCH or the PUSCH.

Embodiment 3

In the embodiment, a measurement reporting implementation process that the network side device configures one reporting setting for the terminal, the one reporting setting corresponds to two CSI resource settings, and the reporting measurement value is the L1-SINR is taken as an example for illustration.

In the embodiment, the network side device configures one CSI resource setting for the terminal; this CSI resource setting corresponds to two CSI resource settings; and each CSI resource setting contains K CSI-RS groups (explicit group or implicit group), and is only used for reporting of the L1-SINR.

In the embodiment, a first CSI-RS group (such as marked as CSI-RS group 1) in the first CSI resource setting is used for channel measurement of one TRP (such as marked as TRP1), and a second CSI-RS group (such as marked as CSI-RS group 2) is used for channel measurement of another TRP (such as marked as TRP2). In addition, a first CSI-RS group (such as marked as CSI-RS group 1) in the second CSI resource setting is used for interference measurement of the TRP1, and a second CSI-RS group (such as marked as CSI-RS group 2) is used for interference measurement of the TRP2. In order to measure the interference between the TRPs, it may be assumed that the first CSI-RS group and the second CSI-RS group in the second CSI resource setting are the second CSI-RS group and the first CSI-RS group in the first CSI resource setting g respectively.

In the embodiment, the measurement reporting method is specifically step m: the terminal determines the QCL-Type D parameter on each CSI-RS resource according to the configuration of the network side device, receives the CSI-RS according to the determined QCL-Type D parameter, and measures and determines a receiving power of each CSI-RS, to determine the L1-SINR values.

In the embodiment, for one CSI-RS resource in the CSI-RS group 1 in the first CSI resource setting, during measurement, the terminal uses the QCL-Type D parameter configured by the network side device on the CSI-RS resource to receive and measure the CSI-RS resource as one channel measurement value (such as marked as N1) of the TRP corresponding to the CSI-RS1 group in the first CSI resource setting. Specifically, for the corresponding CSI-RS resource in the CSI-RS group 1 in the second CSI resource setting, during measurement, the terminal uses the QCL-Type D parameter configured by the network side device on the resource or uses the QCL-Type D parameter of the corresponding CSI-RS resource in the CSI-RS group 1 in the first CSI resource setting to receive and measure the CSI-RS resource as one interference measurement value (such as marked as N2) of the TRP corresponding to the CSI-RS group 1 in the first CSI resource setting.

In the embodiment, for one CSI-RS resource in the CSI-RS group 2 in the first CSI resource setting, during measurement, the terminal uses the QCL-Type D parameter configured by the network side device on the CSI-RS resource to receive and measure the CSI-RS resource as one channel measurement value (such as marked as N3) of the TRP corresponding to the CSI-RS group 2 in the second CSI resource setting. Specifically, for the corresponding CSI-RS resource in the CSI-RS group 2 in the second CSI resource setting, during measurement, the terminal uses the QCL-Type D parameter configured by the network side device on the resource or uses the QCL-Type D parameter of the corresponding CSI-RS resource in the CSI-RS group 2 in the first CSI resource setting to receive and measure the CSI-RS resource as one interference measurement value (such as marked as N4) of the TRP corresponding to the CSI-RS group 2 in the first CSI resource setting.

In the embodiment, when measuring the L1-SINR values on the TRPs corresponding to the CSI-RS groups 1 in the first CSI resource setting and the second CSI resource setting, the terminal uses the measurement values N1 and N2 to determine the L1-SINR values jointly. Specifically, when measuring the L1-SINR values on the TRPs corresponding to the CSI-RS groups 2 in the first CSI resource setting and the second CSI resource setting, the terminal uses the measurement values N3 and N4 to determine the L1-SINR values jointly.

In the embodiment, the network side device may further configure or indicate some assumptions or limitations of the terminal during measurement, for example, the same or different panels are used to receive two CSI-RS resource implicit groups or CSI resource sets or the CSI-RS resources; or the same or different space reception filters are used to receive two CSI-RS resource implicit groups or CSI resource sets or the CSI-RS resources; or whether the terminal performs superimposition processing or interference processing on the CSI-RS group 2 when measuring the CSI-RS group 1 is indicated. Similarly, whether the terminal performs superimposition processing or interference processing on the CSI-RS group 1 when measuring the CSI-RS group 2 may be indicated.

In a case that the network side device configures or does not configure the above assumptions or limitations, the terminal may further report the above measurement assumptions or limitations while reporting the measurement result.

Step n: the terminal determines the CRI or SSBRI contained in the N groups of measurement report values.

In the embodiment, the terminal determines the CRI or SSBRI contained in the reported N groups of measurement values according to the method in step b in the embodiment 1, which will not be repeated here.

Step p: the terminal determines a report format corresponding to the N groups of measurement report values.

In the embodiment, the terminal determines the measurement values according to the mode for determining the differences in step c in the embodiment 1. Specifically, the L1-RSRP in step c in the embodiment 1 may be replaced with the L1-SINR for processing, which will not be repeated here.

Step q: the terminal reports the L1-RSRP measurement values corresponding to the CRI or SSBRI in the N groups of measurement report values to the network side device through the PUCCH or the PUSCH.

Embodiment 4

In the embodiment, another implementation process of measurement reporting that the network side device configures one reporting setting for the terminal, the one reporting setting corresponds to two CSI resource settings, and the reporting measurement value is the L1-SINR is taken as an example for illustration.

In the embodiment, the network side device configures one CSI reporting setting for the terminal, this CSI reporting setting corresponds to two CSI resource settings, and each CSI resource setting contains K (taking K=2 as an example in the following text) CSI-RS groups (explicit group or implicit group).

In the embodiment, the CSI-RS group 1 in the first CSI resource setting is used for channel measurement of one TRP (such as marked as TRP1), and the CSI-RS group 2 is used for interference measurement of the TRP1; and the CSI-RS group 1 in the second CSI resource setting is used for channel measurement of another TRP (such as marked as TRP2), and the CSI-RS group 2 is used for interference measurement of the TRP2. In order to measure the interference between the TRPs, it may further be assumed that the CSI-RS group 2 of the first CSI resource setting is the same as the CSI-RS group 1 of the second CSI resource setting, and the CSI-RS group 2 of the second CSI resource setting is the same as the CSI-RS group 1 of the first CSI resource setting.

Specifically, the measurement reporting method in the embodiment is step w: the terminal determines the QCL-Type D parameter on each CSI-RS resource according to the configuration of the network side device, receives the CSI-RS according to the determined QCL-Type D parameter, and measures and determines a receiving power of each CSI-RS, to determine the L1-SINR values.

In the embodiment, for one CSI-RS resource in the CSI-RS group 1 in the first CSI resource setting, during measurement, the terminal uses the QCL-Type D parameter configured by the network side device on the CSI-RS resource to receive and measure the CSI-RS resource as one channel measurement value (such as marked as P1) of the TRP corresponding to the CSI-RS group 1 in the first CSI resource setting. Specifically, for the corresponding CSI-RS resource in the CSI-RS group 2 in the first CSI resource setting, during measurement, the terminal uses the QCL-Type D parameter configured by the network side device on the CSI-RS resource or uses the QCL-Type D parameter of the corresponding CSI-RS resource in the CSI-RS group 1 in the first CSI resource setting to receive and measure the CSI-RS resource as one interference measurement value (such as marked as P2) of the TRP corresponding to the CSI-RS group 1 in the first CSI resource setting.

In the embodiment, for one CSI-RS resource in the CSI-RS group 1 in the second CSI resource setting, during measurement, the terminal uses the QCL-Type D parameter configured by the network side device on the CSI-RS resource to receive and measure the CSI-RS resource as one channel measurement value (such as marked as P3) of the TRP corresponding to the CSI-RS group 1 in the second CSI resource setting. Specifically, for the corresponding CSI-RS resource in the CSI-RS group 2 in the second CSI resource setting, during measurement, the terminal uses the QCL-Type D parameter configured by the network side device on the CSI-RS resource or uses the QCL-Type D parameter of the corresponding CSI-RS resource in the CSI-RS group 1 in the second CSI resource setting to receive and measure the CSI-RS resource as one interference measurement value (such as marked as P4) of the TRP corresponding to the CSI-RS group 1 in the second CSI resource setting.

In the embodiment, when measuring the L1-SINR values on the TRPs corresponding to the CSI-RS group 1 and the CSI-RS group 2 in the first CSI resource setting, the terminal uses the measurement values P1 and P2 to determine the L1-SINR values jointly. When measuring the L1-SINR values on the TRPs corresponding to the CSI-RS group 1 and the CSI-RS group 2 in the second CSI resource setting, the terminal uses the measurement values P3 and P4 to determine the L1-SINR values jointly.

Step x: the terminal determines the CRI or SSBRI contained in the N groups of measurement report values.

In the embodiment, the terminal determines the CRI or SSBRI contained in the reported N groups of measurement values according to the method in step b in the embodiment 1, which will not be repeated here.

Step y: the terminal determines a report format corresponding to the N groups of measurement report values.

In the embodiment, the terminal determines the measurement values according to the mode for determining the differences in step c in the embodiment 1. Specifically, the L1-RSRP in step c in the embodiment 1 may be replaced with the L1-SINR for processing, which will not be repeated here.

Step z: the terminal reports the L1-RSRP measurement values corresponding to the CRI or SSBRI in the N groups of measurement report values to the network side device through the PUCCH or the PUSCH.

It needs to be noted that, in a specific implementation process, there may be two reporting settings, and each reporting setting corresponds to one CSI resource setting for measurement reporting; there may further be two reporting settings, and each reporting setting corresponds to two CSI resource settings for measurement reporting; and of course, there may further be two reporting settings, the first reporting setting in the two reporting settings corresponds to one CSI resource setting, and the second reporting setting in the two reporting settings corresponds to two CSI resource settings for measurement reporting, which is not limited in the embodiments of the present application.

Figure 3:
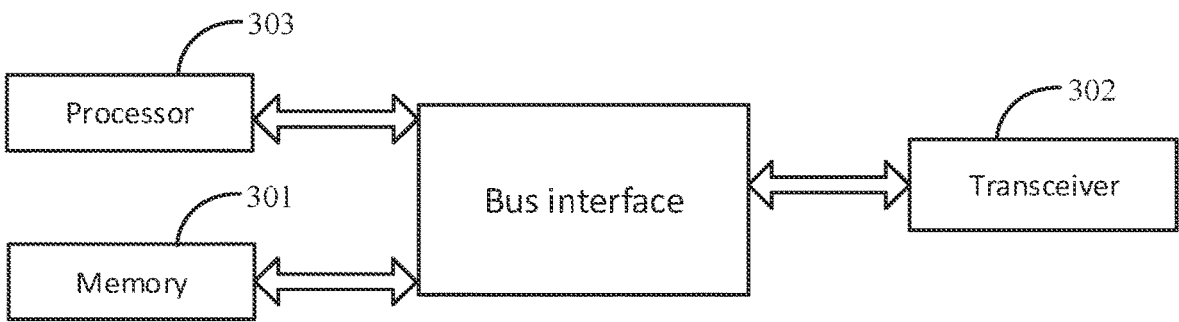
FIG. 3 is a schematic diagram of a physical architecture of a measurement reporting apparatus provided by embodiments of the present application.

Based on the embodiments, referring to FIG. 3, embodiments of the present application provide a measurement reporting apparatus, including a memory 301, a transceiver 302 and a processor 303; and the processor 303 is configured to read a computer program in the memory and execute:

determining, according to a configuration of a network side device, a QCL-Type D parameter and a measurement set for each CSI-RS group used for measurement; and measuring the measurement set based on the QCL-Type D parameter, and determining N groups of measurement report values, where N is a positive integer not less than 1.

In a possible implementation, the processor is configured to execute:

in a case that the network side device configures one CSI resource setting for a terminal, the one CSI resource setting includes K CSI-RS groups, each CSI-RS group includes Z CSI-RS resources, and the CSI-RS resource in each CSI-RS group is configured with one or more QCL-Type D parameters; where Z is a positive integer not less than 1:

determining a first QCL-Type D parameter configured for each of the CSI-RS resources as a QCL-Type D parameter for the CSI-RS resource or for the CSI-RS group which includes the CSI-RS resource used for channel measurement; and determining a QCL-Type D parameter except for the first QCL-Type D parameter as a QCL-Type D parameter for the CSI-RS resource used for interference measurement.

In a possible implementation, the processor is configured to execute:

in a case that the network side device configures one CSI resource setting, and the CSI resource setting includes K CSI-RS groups:

determining, in a case that an L1-SINR of an $m^{th}$ CSI-RS group is measured, that the $m^{th}$ CSI-RS group is for channel measurement, and other CSI-RS groups except for the $m^{th}$ CSI-RS group are for interference measurement; or, determining, in a case that an L1-RSRP of an $m^{th}$ CSI-RS group is measured, that the $m^{th}$ CSI-RS group is for channel measurement; or, determining, in a case that an L1-SINR of an $m^{th}$ CSI-RS group is measured, that the $m^{th}$ CSI-RS group is for channel measurement and interference measurement;

where, m is any value from 0 to K; K is a positive integer not less than 1; and the CSI-RS groups for channel measurement and interference measurement belong to the measurement set, or the CSI-RS group for channel measurement belongs to the measurement set.

In a possible implementation, the processor is configured to execute:

in a case that the network side device configures one CSI resource setting, the CSI resource setting includes K CSI-RS groups, each CSI-RS group includes Z CSI-RS resources, and the CSI-RS resource in each CSI-RS group is configured with one QCL-Type D parameter:

determining a QCL-Type D parameter configured for each of the CSI-RS resources as a QCL-Type D parameter for the CSI-RS resource or for the CSI-RS group which includes the CSI-RS resource used for channel measurement; and determining QCL-Type D parameters configured for CSI-RS resources corresponding to other CSI-RS groups except for the group which includes the CSI-RS resource among the K CSI-RS groups as QCL-Type D parameters for the CSI-RS resource used for interference measurement; or, determining, in a case that an $m^{th}$ CSI-RS group is measured, a QCL-Type D parameter of a $p^{th}$ CSI-RS resource of the $m^{th}$ CSI-RS group as a union set of the QCL-Type D parameter configured for the $p^{th}$ CSI-RS resource and QCL-Type D parameters configured for CSI-RS resources corresponding to CSI-RS groups except for the $m^{th}$ CSI-RS group, where p is any value from 0 to Z, and Z is a positive integer not less than 1; or, determining the QCL-Type D parameter configured for the CSI-RS resource as the QCL-Type D parameter of each CSI-RS resource;

where, m is any value from 0 to K; and K is a positive integer not less than 1.

In a possible implementation, the processor is configured to execute:

in a case that the network side device configures two CSI resource settings, and each CSI resource setting includes K CSI-RS groups:

determining that K CSI-RS groups corresponding to a first CSI resource setting in the two CSI resource settings are for channel measurement, and determining any of K CSI-RS groups corresponding to a second CSI resource setting in the two CSI resource settings as a CSI-RS group for interference measurement, corresponding to the any CSI-RS group, in the first CSI resource setting; or determining that an $m^{th}$ CSI-RS group of the first CSI resource setting in the two CSI resource settings is for channel measurement, and determining the $m^{th}$ CSI-RS group corresponding to the second CSI resource setting in the two CSI resource settings as a CSI-RS group for interference measurement for the $m^{th}$ CSI-RS group in the first CSI resource setting; or determining that a first CSI-RS group of each CSI resource setting is for channel measurement, and the CSI-RS groups except for the first CSI-RS group are for interference measurement;

where, m is any value from 0 to K; K is a positive integer not less than 1; and the CSI-RS groups for channel measurement and interference measurement belong to the measurement set.

In a possible implementation, the processor is configured to execute:

in a case that the network side device configures two CSI resource settings, and each CSI resource setting includes K CSI-RS groups:

determining, in a case that CSI-RS resources in an $m^{th}$ CSI-RS group of a second CSI resource setting are measured, QCL-Type D parameters of corresponding CSI-RS resources in an $m^{th}$ CSI-RS group of a first CSI resource setting as QCL-Type D parameters of the CSI-RS resources in the $m^{th}$ CSI-RS group of the second CSI resource setting; or, determining, in a case that CSI-RS resources in an $m^{th}$ CSI-RS group of each of the CSI resource settings are measured, QCL-Type D parameters of corresponding CSI-RS resources in a first CSI-RS group of each of the CSI resource settings as QCL-Type D parameters of the CSI-RS resources in the $m^{th}$ CSI-RS group;

wherein, m is any value from 0 to K; and K is a positive integer not less than 1.

In a possible implementation, in a case that the CSI-RS group is the CSI-RS group explicitly configured by the network side device, the corresponding CSI-RS resources are two CSI-RS resources having the same sequential value or relative identity values or the same identity value in a configuration of two CSI resource settings; or in a case that the CSI-RS group is a CSI-RS resource implicit group, the corresponding CSI-RS resources are two CSI-RS resources having the same sequential value after the CSI-RS resources in two CSI-RS resource implicit groups are sorted according to the identity values from low to high, where the CSI-RS resource implicit group is CSI-RS resources determined by implicit grouping based on a higher layer parameter or a group index or a physical cell ID contained in each CSI-RS resource.

In a possible implementation, the $m^{th}$ CSI-RS group includes:

an $m^{th}$ CSI-RS group determined based on a configuration order or identities of CSI resource sets in the CSI resource setting from small to large; or an $m^{th}$ CSI-RS group determined based on an order of identity values of the CSI-RS resources from small to large; or an $m^{th}$ CSI-RS group determined based on an order of higher layer parameter configuration values associated with the CSI-RS resources from small to large; or an $m^{th}$ CSI-RS group determined based on an order of identities of the CSI-RS resources with smallest identities in respective CSI-RS groups from small to large.

In a possible implementation, the processor is configured to execute:

receiving CSI-RS resources according to the determined QCL-Type D parameters, and determining L1-RSRP or L1-SINR measurement values; and determining, according to the L1-RSRP or the L1-SINR measurement values, CRI or SSBRI contained in the N groups of measurement report values.

In a possible implementation, the processor is configured to execute:

sorting L1-RSRP or L1-SINR measurement values of the K CSI-RS groups corresponding to the CSI-RS resources from high to low, and determining the CRI or SSBRI contained in any group in the N groups of measurement report values; or sorting the L1-RSRP or L1-SINR measurement values of a single CSI-RS group corresponding to the CSI-RS resources; and determining, based on a maximum L1-RSRP or L1-SINR measurement value in each CSI-RS group, the CRI or SSBRI contained in any group in the N groups of measurement report values.

In a possible implementation, the processor is configured to execute:

in a case that a terminal determines to report measurement values in the CSI-RS groups, the N groups of measurement report values include the CRI or SSBRI contained in each group of measurement report values determined based on sorting of L1-RSRP or L1-SINR report values included in the K CSI-RS groups corresponding to the CSI-RS resources from high to low; or in a case that the terminal determines to report the measurement values among the CSI-RS groups, the N groups of measurement report values include the CRI or SSBRI contained in each group of measurement report values determined based on sorting of L1-RSRP or L1-SINR report values included in a single CSI-RS group corresponding to the CSI-RS resources and based on a maximum L1-RSRP or L1-SINR value in each CSI-RS group.

In a possible implementation, the processor is configured to execute:

determining a CSI-RS resource of a $s^{th}$ L1-RSRP in a set of CSI-RS resource pairs that meet a condition as a first measurement report value in a su group of measurement report values; and determining a CSI-RS resource of a $s^{th}$ L1-RSRP in a set of CSI-RS resource pairs that are received simultaneously with a first CSI-RS resource as a second measurement report value in the $s^{th}$ group of measurement report values; and determining, in the set of the CSI-RS resource pairs that meet the condition, a first measurement report value and a second measurement report value in each $s^{th}$ group as the N groups of measurement report values, where s is a sequence number determined based on L1-RSRP values.

In a possible implementation, the processor is configured to execute:

determining, in a set of CSI-RS resource pairs that meet a condition, sequential values determined by values corresponding to sums of L1-RSRPs of two CSI-RSs in respective CSI-RS resource pairs from high to low; and determining, according to the sequential values, each group of measurement report values in one-to-one correspondence with the sequential values; and determining the N groups of measurement report values based on measurement report values corresponding to all CSI-RS resource pairs, where T is a positive integer less than N.

In a possible implementation, the set of the CSI-RS resource pairs that meet the condition is determined by:

determining the set of the CSI-RS resource pairs that are received simultaneously, based on that resources in different CSI-RS resource groups that are received simultaneously, or resources in a same CSI-RS resource group that are received simultaneously; or, determining the set of the CSI-RS resource pairs that are received simultaneously by determining an association relationship between each QCL-Type D parameter and the terminal reception spatial filter; and when two CSI-RS resources are received, using different antenna panels or antenna groups to simultaneously receive the two CSI-RS resources and obtaining an expected measurement result determined based on the QCL-Type D parameters of the two CSI-RS resources and the association relationship, to determine that the two CSI-RS resources are received simultaneously; or, determining the set of the CSI-RS resource pairs that are received simultaneously based on that: in a case that the network side device configures the terminal to perform inter-group reporting or the terminal does not receive the configuration of the network side device, determining that inter-group reporting is performed, and the terminal respectively selects specific CSI-RS resources that are received simultaneously among the K CSI-RS resource groups; or in a case that the network side device configures the terminal to perform intra-group reporting, the terminal selects specific CSI-RS resources that are received simultaneously in each CSI-RS resource group.

In a possible implementation, the processor is further configured to execute:

determining a report format of the N groups of measurement report values, and reporting the N groups of measurement report values to the network side device with the report format.

In a possible implementation, the report format of the N groups of measurement report values is an intra-group difference format or an inter-group difference format.

In a possible implementation, the processor is configured to execute:

determining that the second to the $w^{th}$ measurement report values in each group of the N groups of measurement report values are all differences from a first measurement report value in the group, where w is a positive integer not less than 2; or, determining that a first group of measurement report values among the N groups of measurement report values are L1-RSRP values or L1-SINR values obtained by measuring, and determining a difference between a $r^{th}$ measurement report value in a $q^{th}$ group of measurement report values except for the first group of measurement report values and a $r^{th}$ measurement report value in the first group of measurement report values, where r is any value from 0 to w;

or, determining that a first measurement report value in the first group among the N groups of measurement report values is an L1-RSRP value or L1-SINR value obtained by measuring, and the measurement report values except for the first measurement report value in the first group and the measurement report values except for the first group are differences from the first measurement report value of the first group of measurement report values, where r is any value from 0 to w;

or, determining that the first measurement report value in the first group among the N groups of measurement report values is an L1-RSRP value or L1-SINR value obtained by measuring, and other measurement report values except for the first measurement report value in the first group are differences from the first measurement report value in the first group of measurement report values, where r is any value from 0 to w.

In a possible implementation, the processor is configured to execute:

reporting the N groups of measurement report values to the network side device with the report format through a PUCCH or a PUSCH.

In a possible implementation, the processor is configured to execute:

determining, in a case of reporting the N groups of measurement report values, predefined T bits added in UCI indicates a position where a difference measurement value or a non-difference measurement value appears in the group, where T is determined based on the number of groups of measurement report values and the number of the measurement report values in each group.

In a possible implementation, the processor is configured to execute:

determining, in a case of reporting the N groups of measurement report values, a predefined number of bits in UCI indicates an association relationship between the measurement value and the CSI-RS resource groups, or indicates whether corresponding CSI-RS resource groups exchange in order.

In a possible implementation, the processor is configured to execute:

determining the number of reported bits of each difference measurement value or each measurement value in the N groups of measurement report values; and reporting the N groups of measurement report values to the network side device based on the number of reported bits and a predefined report rule.

Figure 4:
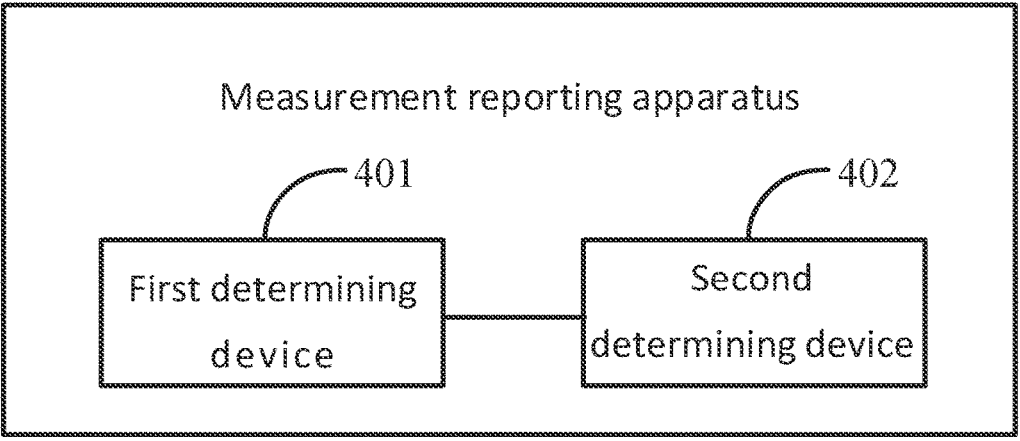
FIG. 4 is a schematic diagram of a logical architecture of a measurement reporting apparatus provided by embodiments of the present application.

Based on the embodiments, as shown in FIG. 4, embodiments of the present application provide a measurement reporting apparatus, including:

a first determining device 401, configured to determine, according to a configuration of a network side device, a QCL-Type D parameter and a measurement set for each CSI-RS group used for measurement; and a second determining device 402, configured to measure the measurement set based on the QCL-Type D parameter, and determine N groups of measurement report values, where N is a positive integer not less than 1.

The above first determining device 401 and second determining device 402 cooperate with each other to implement any method executed by the measurement reporting apparatus described in the above embodiments.

Based on the embodiment of the present application provides a processor readable storage medium, storing a computer program, where the computer program is configured to cause a processor to execute the described measurement reporting method.

The embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, a compact disc read-only memory (CD-ROM), an optical memory and the like) containing computer available program codes.

The present application is described with reference to the flow charts and/or block diagrams of the method, apparatus (system), and computer program product according to the present application. It should be understood that each flow and/or block in the flow chart and/or block diagram and the combination of flows and/or blocks in the flow chart and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow chart and/or one or more blocks of the block diagram.

These computer program instructions can also be stored in a computer-readable memory capable of guiding a computer or other programmable data processing devices to work in a specific manner, so that instructions stored in the computer-readable memory generate a manufacture including an instruction apparatus, and the instruction apparatus implements the functions specified in one or more flows of the flow chart and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow chart and/or one or more blocks of the block diagram.

What is claimed is:

1. A measurement reporting method, comprising:

determining, according to a configuration of a network side device, a quasi co-location type D (QCL-Type D) parameter and a measurement set for each of channel state information reference signal (CSI-RS) groups used for measurement, wherein the configuration of the network side device comprises at least one channel state information (CSI) resource setting; and measuring the measurement set based on the QCL-Type D parameter, and determining N groups of measurement report values, wherein N is a positive integer not less than 1;

wherein the method further comprises: determining a report format of the N groups of measurement report values, and reporting the N groups of measurement report values to the network side device with the report format:

wherein the method further comprises:

determining, in a case of reporting the N groups of measurement report values, predefined T bits added in uplink control information (UCI) indicate a position where a difference measurement value or a non-difference measurement value appears in a group, wherein T is determined based on a quantity of groups of measurement report values and a quantity of the measurement report values in each group; wherein T is a positive integer less than N; or, determining, in a case of reporting the N groups of measurement report values, a predefined number of bits in UCI indicates an association relationship between the measurement value and CSI-RS resource groups, or indicates whether corresponding CSI-RS resource groups exchange in order.

2. The method according to claim 1, wherein the determining, according to the configuration of the network side device, the QCL-Type D parameter for each of CSI-RS groups used for measurement, comprises:

in a case that the network side device configures one CSI resource setting for a terminal, the one CSI resource setting comprises K CSI-RS groups, each of the CSI-RS groups comprises Z CSI-RS resources, and the CSI-RS resource in each CSI-RS group is configured with one or more QCL-Type D parameters; wherein Z is a positive integer not less than 1:

determining a first QCL-Type D parameter configured for each of the CSI-RS resources as a QCL-Type D parameter for the CSI-RS resource or for the CSI-RS group which comprises the CSI-RS resource used for channel measurement; and determining a QCL-Type D parameter except for the first QCL-Type D parameter as a QCL-Type D parameter for the CSI-RS resource used for interference measurement;

or, wherein the determining, according to the configuration of the network side device, the QCL-Type D parameter for each of CSI-RS groups used for measurement, comprises:

in a case that the network side device configures one CSI resource setting, the CSI resource setting comprises K CSI-RS groups, each of the CSI-RS groups comprises Z CSI-RS resources, and the CSI-RS resource in each CSI-RS group is configured with one QCL-Type D parameter:

determining a QCL-Type D parameter configured for each of the CSI-RS resources as a QCL-Type D parameter for the CSI-RS resource or for the CSI-RS group which comprises the CSI-RS resource used for channel measurement; and determining QCL-Type D parameters configured for CSI-RS resources corresponding to other CSI-RS groups except for the group which comprises the CSI-RS resource among the K CSI-RS groups as QCL-Type D parameters for the CSI-RS resource used for interference measurement;

or, determining, in a case that an $m^{th}$ CSI-RS group is measured, a QCL-Type D parameter of a $p^{th}$ CSI-RS resource of the $m^{th}$ CSI-RS group as a union set of the QCL-Type D parameter configured for the $p^{th}$ CSI-RS resource and QCL-Type D parameters configured for CSI-RS resources corresponding to CSI-RS groups except for the $m^{th}$ CSI-RS group, wherein p is any value from 0 to Z, and Z is a positive integer not less than 1;

or, determining the QCL-Type D parameter configured for the CSI-RS resource as a QCL-Type D parameter of each of the CSI-RS resources;

wherein, m is any value from 0 to K; and K is a positive integer not less than 1.

3. The method according to claim 2, wherein the $m^{th}$ CSI-RS group comprises:

an $m^{th}$ CSI-RS group determined based on a configuration order or identities of CSI resource sets in the CSI resource setting from small to large; or an $m^{th}$ CSI-RS group determined based on an order of identity values of the CSI-RS resources from small to large; or an $m^{th}$ CSI-RS group determined based on an order of higher layer parameter configuration values associated with the CSI-RS resources from small to large; or an $m^{th}$ CSI-RS group determined based on an order of identities of CSI-RS resources with smallest identities in respective CSI-RS groups from small to large.

4. The method according to claim 1, wherein the determining, according to the configuration of the network side device, the measurement set for each of CSI-RS groups used for measurement, comprises:

in a case that the network side device configures one CSI resource setting, and the CSI resource setting comprises K CSI-RS groups:

determining, in a case that a layer-1 signal to interference plus noise ratio (L1-SINR) of an $m^{th}$ CSI-RS group is measured, that the $m^{th}$ CSI-RS group is for channel measurement, and other CSI-RS groups except for the $m^{th}$ CSI-RS group are for interference measurement; or, determining, in a case that a layer-1 reference signal receiving power (L1-RSRP) of an $m^{th}$ CSI-RS group is measured, that the $m^{th}$ CSI-RS group is for channel measurement; or, determining, in a case that an L1-SINR of an $m^{th}$ CSI-RS group is measured, that the $m^{th}$ CSI-RS group is for channel measurement and interference measurement;

wherein, m is any value from 0 to K; K is a positive integer not less than 1; and the CSI-RS groups for channel measurement and interference measurement belong to the measurement set, or the CSI-RS group for channel measurement belongs to the measurement set.

5. The method according to claim 1, wherein the determining, according to the configuration of the network side device, the measurement set for each of CSI-RS groups used for measurement, comprises:

in a case that the network side device configures two CSI resource settings, and each of the CSI resource settings comprises K CSI-RS groups:

determining that K CSI-RS groups corresponding to a first CSI resource setting in the two CSI resource settings are for channel measurement, and determining any of K CSI-RS groups corresponding to a second CSI resource setting in the two CSI resource settings as a CSI-RS group for interference measurement, corresponding to the any CSI-RS group, in the first CSI resource setting; or determining that an $m^{th}$ CSI-RS group of a first CSI resource setting in the two CSI resource settings is for channel measurement, and determining an $m^{th}$ CSI-RS group corresponding to a second CSI resource setting in the two CSI resource settings as a CSI-RS group for interference measurement for the $m^{th}$ CSI-RS group in the first CSI resource setting; or determining that a first CSI-RS group of each of the CSI resource settings is for channel measurement, and CSI-RS groups except for the first CSI-RS group are for interference measurement;

wherein, m is any value from 0 to K; K is a positive integer not less than 1; and the CSI-RS groups for channel measurement and interference measurement belong to the measurement set.

6. The method according to claim 1, wherein the determining, according to the configuration of the network side device, the QCL-Type D parameter for each of CSI-RS group used for measurement, comprises:

in a case that the network side device configures two CSI resource settings, and each of the CSI resource settings comprises K CSI-RS groups:

determining, in a case that CSI-RS resources in an $m^{th}$ CSI-RS group of a second CSI resource setting are measured, QCL-Type D parameters of corresponding CSI-RS resources in an $m^{th}$ CSI-RS group of a first CSI resource setting as QCL-Type D parameters of the CSI-RS resources in the $m^{th}$ CSI-RS group of the second CSI resource setting; or, determining, in a case that CSI-RS resources in an $m^{th}$ CSI-RS group of each of the CSI resource settings are measured, QCL-Type D parameters of corresponding CSI-RS resources in a first CSI-RS group of each of the CSI resource settings as QCL-Type D parameters of the CSI-RS resources in the $m^{th}$ CSI-RS group;

wherein, m is any value from 0 to K; and K is a positive integer not less than 1;

wherein, in a case that the CSI-RS group is a CSI-RS group explicitly configured by the network side device, the corresponding CSI-RS resources are two CSI-RS resources having a same sequential value or relative identity values or a same identity value in a configuration of the two CSI resource settings; or in a case that the CSI-RS group is a CSI-RS resource implicit group, the corresponding CSI-RS resources are two CSI-RS resources having a same sequential value after CSI-RS resources in two CSI-RS resource implicit groups are sorted according to identity values from low to high, wherein the CSI-RS resource implicit group is CSI-RS resources determined by implicit grouping based on a higher layer parameter or a group index or a physical cell identity document (ID) in each CSI-RS resource.

7. The method according to claim 1, wherein the measuring the measurement set based on the QCL-Type D parameter, and determining the N groups of measurement report values, comprise:

receiving CSI-RS resources according to the determined QCL-Type D parameters, and determining L1-RSRP or L1-SINR measurement values; and determining, according to the L1-RSRP or L1-SINR measurement values, CSI-RS resource indication (CRI) or synchronization signal block resource indicator (SSBRI) in the N groups of measurement report values.

8. The method according to claim 7, wherein the determining the N groups of measurement report values, comprises:

in a case that a terminal determines to report measurement values in the CSI-RS groups, the N groups of measurement report values comprise the CRI or SSBRI in each group of measurement report values determined based on sorting of the L1-RSRP or L1-SINR report values in K CSI-RS groups corresponding to the CSI-RS resources from high to low; or in a case that the terminal determines to report the measurement values among the CSI-RS groups, the N groups of measurement report values comprise the CRI or SSBRI in each group of measurement report values determined based on sorting of the L1-RSRP or L1-SINR report values in a single CSI-RS group corresponding to the CSI-RS resources and based on a maximum L1-RSRP or L1-SINR value in each CSI-RS group;

or, wherein the determining the N groups of measurement report values, comprises:

determining a CSI-RS resource of a $s^{th}$ L1-RSRP in a set of CSI-RS resource pairs that meet a condition as a first measurement report value in a $s^{th}$ group of measurement report values; and determining a CSI-RS resource of the $s^{th}$ L1-RSRP in the set of the CSI-RS resource pairs that are received simultaneously with a first CSI-RS resource as a second measurement report value in the $s^{th}$ group of measurement report values; and determining, in the set of the CSI-RS resource pairs that meet the condition, a first measurement report value and a second measurement report value in each $s^{th}$ group as the N groups of measurement report values, wherein s is a sequence number determined based on L1-RSRP values;

or, wherein the determining the N groups of measurement report values, comprises:

determining, in a set of CSI-RS resource pairs that meet a condition, sequential values determined by values corresponding to sums of L1-RSRPs of two CSI-RSs in respective CSI-RS resource pairs from high to low; and determining, according to the sequential values, each of groups of measurement report values in one-to-one correspondence with the sequential values; and determining the N groups of measurement report values based on measurement report values corresponding to all CSI-RS resource pair.

9. The method according to claim 1, wherein the report format of the N groups of measurement report values is an intra-group difference format or an inter-group difference format.

10. The method according to claim 1, further comprising:

determining that a second measurement report value to a $w^{th}$ measurement report value in each group of the N groups of measurement report values are all differences from a first measurement report value in the group, wherein w is a positive integer not less than 2;

or, determining that a first group of measurement report values among the N groups of measurement report values are L1-RSRP values or L1-SINR values obtained by measuring, and determining a difference between a $r^{th}$ measurement report value in a $q^{th}$ group of measurement report values except for the first group of measurement report values and a $r^{th}$ measurement report value in the first group of measurement report values, wherein r is any value from 0 to w;

or, determining that a first measurement report value in a first group among the N groups of measurement report values is an L1-RSRP value or L1-SINR value obtained by measuring, and measurement report values except for the first measurement report value in the first group and measurement report values except for the first group are differences from the first measurement report value of the first group of measurement report values; or, determining that a first measurement report value in a first group among the N groups of measurement report values is an L1-RSRP value or L1-SINR value obtained by measuring, and other measurement report values except for the first measurement report value in the first group are differences from the first measurement report value in the first group of measurement report values.

11. The method according to claim 1, wherein the reporting the N groups of measurement report values to the network side device with the report format, comprises:

reporting the N groups of measurement report values to the network side device with the report format through a physical uplink control channel (PUCCH) or a physical uplink shared channel (PUSCH).

12. A measurement reporting apparatus, comprising a memory, a transceiver and a processor:

wherein the memory is configured to store a computer program; the transceiver is configured to receive and send data under control of the processor; and the processor is configured to read the computer program in the memory and execute:

determining, according to a configuration of a network side device, a quasi co-location type D (QCL-Type D) parameter and a measurement set for each of channel state information reference signal (CSI-RS) group used for measurement, wherein the configuration of the network side device comprises at least one channel state information (CSI) resource setting; and measuring the measurement set based on the QCL-Type D parameter, and determining N groups of measurement report values, wherein N is a positive integer not less than 1;

wherein the processor is further configured to execute: determining a report format of the N groups of measurement report values, and reporting the N groups of measurement report values to the network side device with the report format;

wherein the processor is configured to execute:

determining, in a case of reporting the N groups of measurement report values, predefined T bits added in uplink control information (UCI) indicate a position where a difference measurement value or a non-difference measurement value appears in a group, wherein T is determined based on a quantity of groups of measurement report values and a quantity of the measurement report values in each group; wherein T is a positive integer less than N; or, determining, in a case of reporting the N groups of measurement report values, a predefined number of bits in UCI indicates an association relationship between the measurement value and CSI-RS resource groups, or indicates whether corresponding CSI-RS resource groups exchange in order.

13. The apparatus according to claim 12, wherein the processor is configured to execute:

in a case that the network side device configures one CSI resource setting, and the CSI resource setting comprises K CSI-RS groups:

determining, in a case that a layer-1 signal to interference plus noise ratio (L1-SINR) of an $m^{th}$ CSI-RS group is measured, that the $m^{th}$ CSI-RS group is for channel measurement, and other CSI-RS groups except for the $m^{th}$ CSI-RS group are for interference measurement; or, determining, in a case that a layer-1 reference signal receiving power (L1-RSRP) of an $m^{th}$ CSI-RS group is measured, that the $m^{th}$ CSI-RS group is for channel measurement; or, determining, in a case that an L1-SINR of an $m^{th}$ CSI-RS group is measured, that the $m^{th}$ CSI-RS group is for channel measurement and interference measurement;

wherein, m is any value from 0 to K; K is a positive integer not less than 1; and the CSI-RS groups for channel measurement and interference measurement belong to the measurement set, or the CSI-RS group for channel measurement belongs to the measurement set.

14. The apparatus according to claim 12, wherein the report format of the N groups of measurement report values is an intra-group difference format or an inter-group difference format.

15. The apparatus according to claim 14, wherein the processor is configured to execute:

determining that a second measurement report value to a $w^{th}$ measurement report value in each group of the N groups of measurement report values are all differences from a first measurement report value in the group, wherein w is a positive integer not less than 2; or, determining that a first group of measurement report values among the N groups of measurement report values are L1-RSRP values or L1-SINR values obtained by measuring, and determining a difference between a $r^{th}$ measurement report value in a $q^{th}$ group of measurement report values except for the first group of measurement report values and a $r^{th}$ measurement report value in the first group of measurement report values, wherein r is any value from 0 to w; or, determining that a first measurement report value in a first group among the N groups of measurement report values is an L1-RSRP value or L1-SINR value obtained by measuring, and measurement report values except for the first measurement report value in the first group and measurement report values except for the first group are differences from the first measurement report value of the first group of measurement report values, where r is any value from 0 to w; or, determining that a first measurement report value in a first group among the N groups of measurement report values is an L1-RSRP value or L1-SINR value obtained by measuring, and other measurement report values except for the first measurement report value in the first group are differences from the first measurement report value in the first group of measurement report values, wherein r is any value from 0 to w.

16. The apparatus according to claim 14, wherein the processor is configured to execute:

reporting the N groups of measurement report values to the network side device with the report format through a physical uplink control channel (PUCCH) or a physical uplink shared channel (PUSCH).

* * * * *